US012602277B2

(12) United States Patent　　　　　(10) Patent No.: US 12,602,277 B2
Paulraj et al.　　　　　　　　　　　　(45) Date of Patent:　　Apr. 14, 2026

(54) MANAGING DATA PROCESSING SYSTEM FAILURES USING HIDDEN KNOWLEDGE FROM PREDICTIVE MODELS FOR FAILURE RESPONSE GENERATION

(71) Applicant: Dell Products L.P., Round Rock, TX (US)

(72) Inventors: Deepaganesh Paulraj, Bangalore (IN); Min Gong, Shanghai (CN); Ashok Narayanan Potti, Bangalore (IN); Dale Wang, Hayward, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/417,417

(22) Filed: Jan. 19, 2024

(65) Prior Publication Data

US 2025/0238302 A1　　Jul. 24, 2025

(51) Int. Cl.
　　*G06F 11/00*　　　　(2006.01)
　　*G06F 11/07*　　　　(2006.01)
　　*G06N 3/0455*　　　(2023.01)

(52) U.S. Cl.
　　CPC ........ *G06F 11/079* (2013.01); *G06F 11/0709* (2013.01); *G06N 3/0455* (2023.01)

(58) Field of Classification Search
　　CPC .. G06F 11/079; G06F 11/0709; G06N 3/0455
　　　　　　　(Continued)

(56) References Cited

U.S. PATENT DOCUMENTS 8,538,897 B2　9/2013　Han et al.
10,572,329 B2　2/2020　Harutyunyan et al.
　　　　　　(Continued)

FOREIGN PATENT DOCUMENTS

CN　　108280168 A　7/2018
CN　　111476371 A　7/2020
　　　　　　(Continued)

OTHER PUBLICATIONS

Zhao, Wayne Xin, et al., "A Survey of Large Language Models," arXiv preprint arXiv:2303.18223 (2023) (97 Pages).
　　　　　　(Continued)

*Primary Examiner* — Sarai E Butler

(74) *Attorney, Agent, or Firm* — WOMBLE BOND DICKINSON (US) LLP

(57)　　　　　　ABSTRACT

Methods and systems for managing data processing systems are disclosed. A data processing system may include and depend on the operation of hardware and/or software components. Inference models may be implemented to predict future system infrastructure outcomes (e.g., component failures) using information recorded in logs that reflect the operation of the components. However, the models may be complex "black boxes" and may generate critical outcome predictions for downstream consumers without explanations of how the predictions are determined, resulting in downstream consumers having low confidence in the predictions. Therefore, hidden knowledge (e.g., structured knowledge attributes) of the models may be extracted and/or used to understand the underlying processes that the models use to predict the system infrastructure outcomes. The hidden knowledge may be stored in a repository and may be provided for downstream use in order to increase the likelihood of preventing and/or mitigating future data processing system failures.

20 Claims, 12 Drawing Sheets

(58) Field of Classification Search
USPC ...................................................... 714/1–57
See application file for complete search history.

(56) References Cited

U.S. PATENT DOCUMENTS

| | | | |
|---|---|---|---|
| 10,616,314 | B1 | 4/2020 | Plenderleith et al. |
| 10,740,793 | B1 | 8/2020 | Sussman et al. |
| 10,776,196 | B2 | 9/2020 | Ohana et al. |
| 10,853,867 | B1 | 12/2020 | Bulusu et al. |
| 11,461,163 | B1 | 10/2022 | Aggarwal |
| 11,513,930 | B2 | 11/2022 | Chan et al. |
| 11,514,347 | B2 | 11/2022 | Dinh |
| 11,714,721 | B2 * | 8/2023 | Ehsan ................. G06F 11/3452 714/41 |
| 11,720,940 | B2 | 8/2023 | Lakshminarayan et al. |
| 11,734,102 | B1 | 8/2023 | Wang et al. |
| 11,748,185 | B2 | 9/2023 | Xu et al. |
| 11,789,846 | B2 * | 10/2023 | Loeb ................... G06F 11/3636 707/703 |
| 11,803,440 | B2 | 10/2023 | Harutyunyan |
| 11,809,271 | B1 | 11/2023 | Wang |
| 11,909,836 | B2 | 2/2024 | Wulf et al. |
| 12,061,970 | B1 | 8/2024 | Lo et al. |
| 12,073,930 | B1 * | 8/2024 | Alperin ................. G16H 10/60 |
| 2005/0033761 | A1 | 2/2005 | Guttman |
| 2009/0113248 | A1 | 4/2009 | Bock et al. |
| 2009/0216910 | A1 | 8/2009 | Duchesneau |
| 2010/0257058 | A1 | 10/2010 | Karidi et al. |
| 2010/0318856 | A1 | 12/2010 | Yoshida |
| 2013/0041748 | A1 | 2/2013 | Hsiao et al. |
| 2013/0198240 | A1 | 8/2013 | Ameri-Yahia et al. |
| 2014/0298112 | A1 * | 10/2014 | Otsuka .................. G06F 11/008 714/47.3 |
| 2014/0310222 | A1 | 10/2014 | Davlos et al. |
| 2015/0227838 | A1 | 8/2015 | Wang et al. |
| 2015/0288557 | A1 | 10/2015 | Gates et al. |
| 2017/0097860 | A1 * | 4/2017 | Pang ..................... G06F 11/079 |
| 2018/0205645 | A1 | 7/2018 | Bays |
| 2019/0095313 | A1 | 3/2019 | Xu et al. |
| 2019/0129785 | A1 | 5/2019 | Liu et al. |
| 2020/0026590 | A1 | 1/2020 | Lopez et al. |
| 2020/0174870 | A1 | 6/2020 | Xu |
| 2020/0401397 | A1 * | 12/2020 | Thomas ................ G06F 11/327 |
| 2021/0027205 | A1 | 1/2021 | Sevakula et al. |
| 2021/0241141 | A1 | 8/2021 | Dugger et al. |
| 2021/0241152 | A1 | 8/2021 | Fong |
| 2021/0287109 | A1 | 9/2021 | Cmielowski et al. |
| 2022/0100187 | A1 | 3/2022 | Isik et al. |
| 2022/0188181 | A1 * | 6/2022 | Saha ........................ G06N 3/09 |
| 2022/0283890 | A1 | 9/2022 | Chopra et al. |
| 2022/0358005 | A1 | 11/2022 | Saha et al. |
| 2022/0382611 | A1 | 12/2022 | Kapish |
| 2022/0417078 | A1 | 12/2022 | Matsuo et al. |
| 2023/0016199 | A1 | 1/2023 | Jividen et al. |
| 2023/0094373 | A1 * | 3/2023 | Muralidharan ..... G06F 11/3409 714/38.1 |
| 2023/0099001 | A1 | 3/2023 | Harutyunyan |
| 2023/0214285 | A1 * | 7/2023 | Arumugam Maharaja ................. G06F 11/073 714/42 |
| 2023/0229220 | A1 * | 7/2023 | Suryanarayana ... H02M 5/4585 714/14 |
| 2023/0297453 | A1 * | 9/2023 | Viclizki ................. G06N 3/045 714/47.2 |
| 2023/0305945 | A1 * | 9/2023 | Ratho ................... G06F 11/328 |
| 2023/0325468 | A1 | 10/2023 | Srinivasan |
| 2024/0028955 | A1 | 1/2024 | Harutyunyan et al. |
| 2024/0118965 | A1 * | 4/2024 | Ashrafi .............. G06F 11/0712 |
| 2024/0168835 | A1 | 5/2024 | Wang et al. |
| 2024/0345911 | A1 * | 10/2024 | Bellam .............. G06F 11/0709 |
| 2024/0362106 | A1 * | 10/2024 | Burch ................. G06F 11/0721 |
| 2024/0411752 | A1 | 12/2024 | Prabhakar |
| 2025/0061042 | A1 * | 2/2025 | Krishnan ........... G06F 11/3072 |
| 2025/0080395 | A1 * | 3/2025 | Agarwal ............ H04L 41/0677 |
| 2025/0086211 | A1 | 3/2025 | Bolcer et al. |
| 2025/0139374 | A1 | 5/2025 | Cui |
| 2025/0147754 | A1 | 5/2025 | Kholodkov |
| 2025/0147832 | A1 | 5/2025 | Agrawal |
| 2025/0190763 | A1 | 6/2025 | Banuelos |
| 2025/0238306 | A1 | 7/2025 | Paulraj |

FOREIGN PATENT DOCUMENTS

| | | |
|---|---|---|
| CN | 112541806 A | 3/2021 |
| EP | 4235505 A1 | 8/2023 |

OTHER PUBLICATIONS

Kaddour, Jean, et al., "Challenges and Applications of Large Language Models," arXiv preprint arXiv:2307.10169 (2023) (72 Pages).

Naveed, Humza, et al., "A Comprehensive Overview of Large Language Models," arXiv preprint arXiv:2307.06435 (2023) (35 Pages).

Boffa, Matteo, et al., "LogPrécis: Unleashing Language Models for Automated Shell Log Analysi," arXiv preprint arXiv:2307.08309 (2023) (17 Pages).

Chen, Yinfang, et al., "Empowering Practical Root Cause Analysis by Large Language Models for Cloud Incidents," arXiv preprint arXiv:2305. 15778 (2023) (15 Pages).

Lee, Yukyung, et al., "LAnoBERT : System Log Anomaly Detection based on BERT Masked Language Model," Applied Soft Computing 146 (2023): 110689 (18 Pages).

* cited by examiner

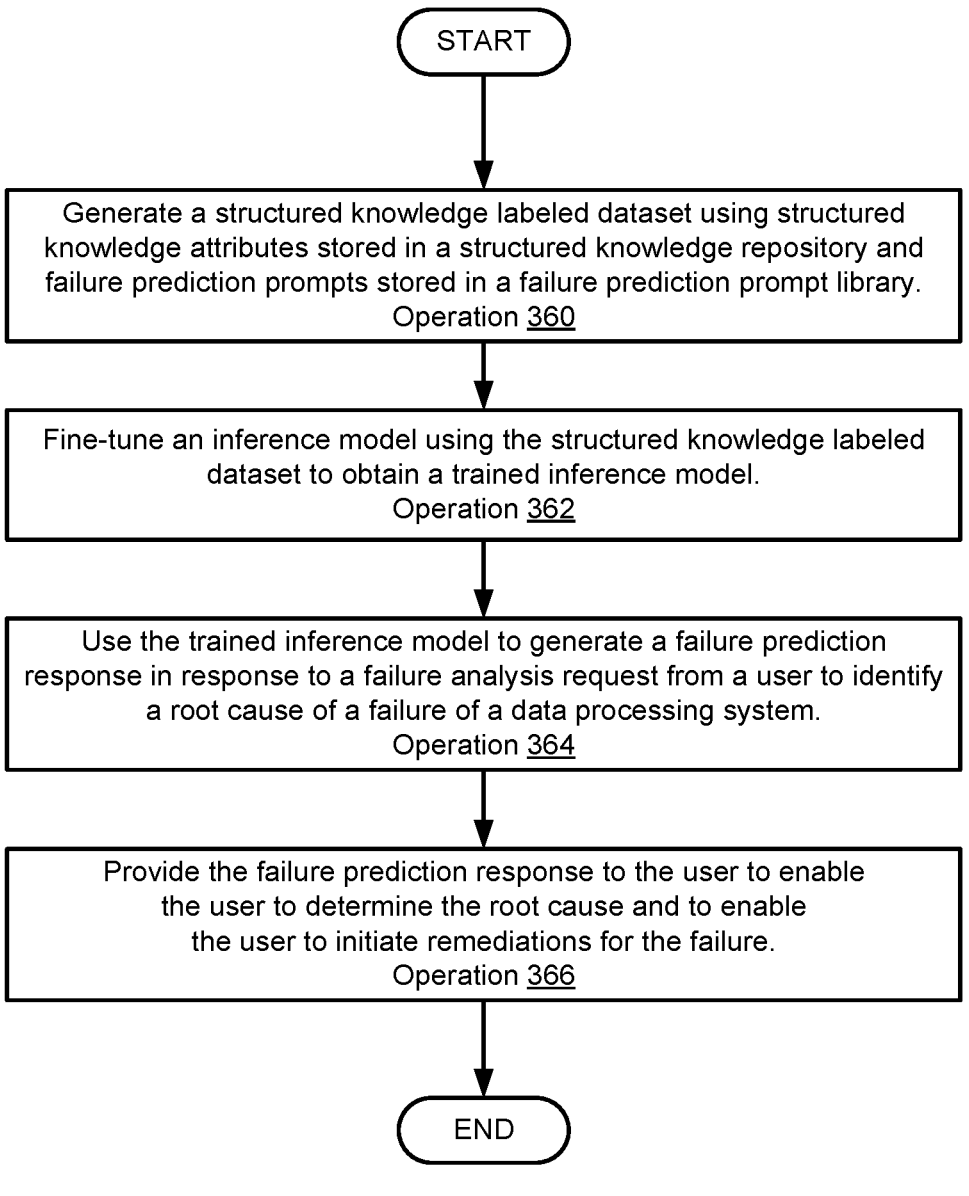

START

Generate a structured knowledge labeled dataset using structured knowledge attributes stored in a structured knowledge repository and failure prediction prompts stored in a failure prediction prompt library.
Operation 360

Fine-tune an inference model using the structured knowledge labeled dataset to obtain a trained inference model.
Operation 362

Use the trained inference model to generate a failure prediction response in response to a failure analysis request from a user to identify a root cause of a failure of a data processing system.
Operation 364

Provide the failure prediction response to the user to enable the user to determine the root cause and to enable the user to initiate remediations for the failure.
Operation 366

END

FIG. 3C

MANAGING DATA PROCESSING SYSTEM FAILURES USING HIDDEN KNOWLEDGE FROM PREDICTIVE MODELS FOR FAILURE RESPONSE GENERATION

FIELD

Embodiments disclosed herein relate generally to device management. More particularly, embodiments disclosed herein relate to systems and methods to manage the operation of devices through inference modeling and log analysis.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 3C shows a flow diagram illustrating a method of obtaining failure prediction responses in accordance with an embodiment.

DETAILED DESCRIPTION

Figure 1:
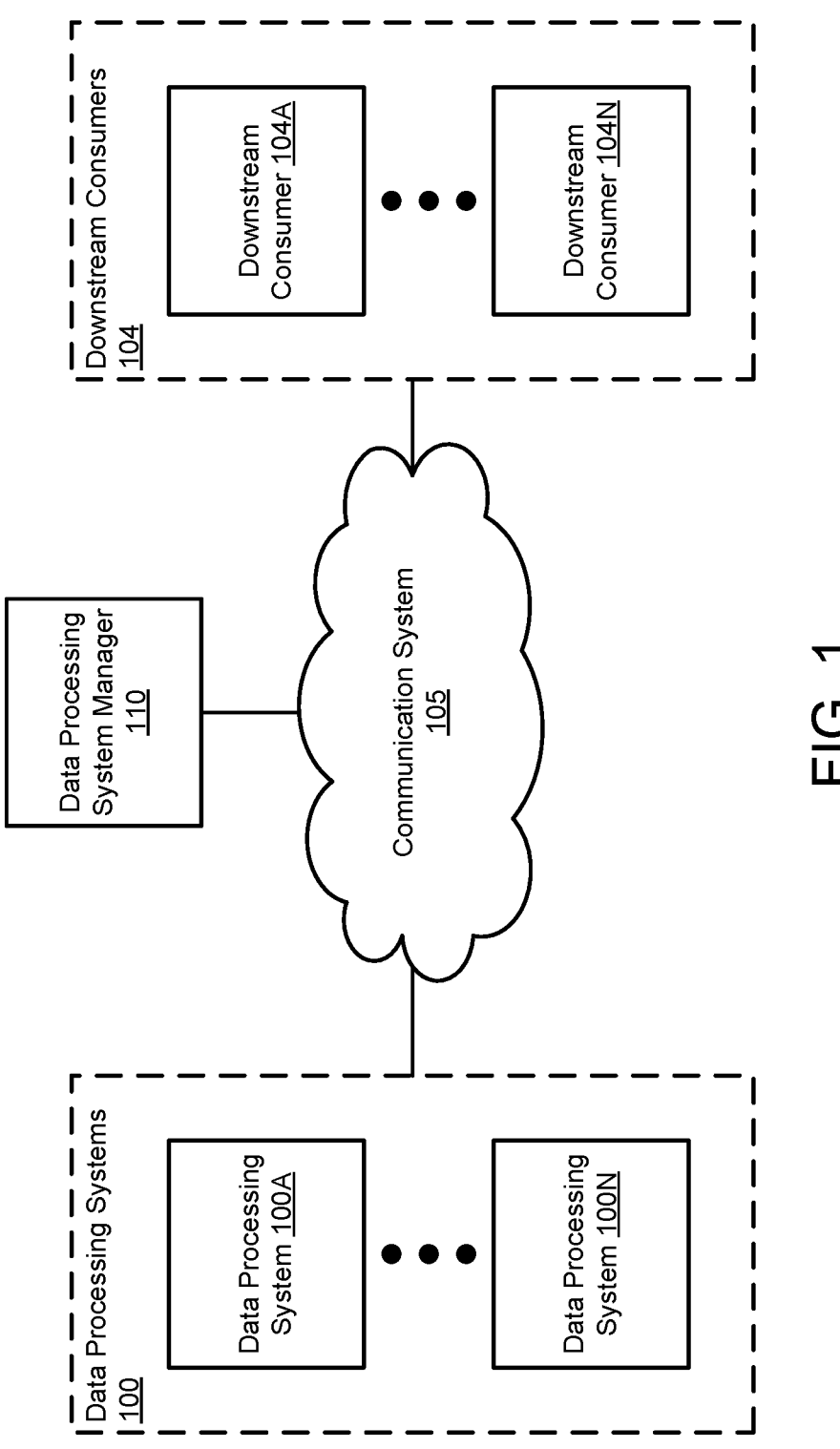
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems based on indications of a failure. A data processing system may include one or more hardware and/or software components. The operation of the data processing system may depend on the operation of these components. For example, improper operation of any of these components may impair (e.g., reduce performance, reduce functionality, etc.) the operation of the data processing system and/or contribute to a system failure. For data processing systems providing computer-implemented services (e.g., to downstream consumers), improper operation of the components of the data processing system may lead to a reduction in quality of and/or cessation of the computer-implemented services.

To manage the operation of the data processing system, the system may include a data processing system manager. The data processing system manager may obtain log data for data processing systems reflecting the historical operation of these data processing systems. The logs of historical activity of the data processing system (e.g., historical log data) may be used to predict the future operation of the data processing system (e.g., to predict the failure of a component that may result in a future undesired operation of the data processing system), and/or to provide other functions.

For example, historical log data may be analyzed using machine learning methods in order to obtain various types of (trained) inference models. One or more inference models may be trained to identify failure patterns (e.g., patterns that may lead to component failures) upon ingesting log data. For example, an inference model may be trained to predict component failures based on real-time portions of log data (e.g., log segments, which may include one or more log messages and/or one or more log lines). Inference models may also be trained to predict additional failure information associated with the predicted component failure (e.g., a time-to-failure).

The failure information (e.g., including the predicted failure and additional failure information) may allow for proper assessment of the current and/or future operation of the data processing system, and to identify appropriate measures (e.g., user actions) to remediate the predicted failure and/or any other related system infrastructure issues. However, the (trained) inference models may generate inferences (e.g., failure predictions and/or actions for failure remediation) without visibility into the underlying rule set (e.g., decisions and/or processes) that is implemented by the trained inference model in order to generate the inferences.

This lack of visibility may make it difficult for users (e.g., downstream consumers) to trust inferences (e.g., failure predictions) obtained from the inference model without manual validation of the inferences (e.g., by a user), which may be time-consuming and inefficient.

Therefore, to improve the trustworthiness of inference models and their associated inferences (e.g., without manual validation), various tools and/or frameworks (e.g., explainable artificial intelligence (AI)) may be implemented to interpret and/or extract hidden knowledge from the inference models. Hidden knowledge may refer to any type of knowledge that may be extracted from the inference model based on the architecture of the inference model and/or the training data on which the inference model architecture is based.

For example, hidden knowledge may include structured knowledge attributes that describe relationships between objects (e.g., between input features of ingest data and/or inferences generated by the model that are associated with the ingest data), and/or rules, policies, or procedures for generating inferences (e.g., based on the ingest data). The hidden knowledge extracted from inference models may provide for interpretability of the outcomes (e.g., predictions) of the inference models, which may allow for the evaluation of the trustworthiness of the predictions (e.g., failure predictions).

Hidden knowledge (e.g., structured knowledge attributes) may be implemented (i) to increase confidence in the downstream use of inference models (e.g., evaluating the trustworthiness of inferences generated by the inference model that may be relied upon by downstream consumers for critical decision-making), (ii) to improve the inference models (e.g., to trouble-shoot errors made by inference models and/or identify sources of bias in training data used to train the inference models), and/or (iii) in various other downstream uses. Therefore, once hidden knowledge is extracted from an inference model, the hidden knowledge may be stored (e.g., in a repository) in a structured format usable for downstream use.

By doing so, embodiments disclosed herein may provide a system for managing data processing systems based on indications of a failure using hidden knowledge extracted from inference models (e.g., inference models trained to predict the indicated failure). The extracted hidden knowledge may be manipulated (e.g., using statistical methods), organized, and/or stored as structured knowledge attributes (e.g., in a repository managed by a database). The database may be queried by downstream consumers (e.g., service technicians, applications, etc.) that may utilize the hidden knowledge as an explanatory tool to improve the management of potential (e.g., indicated) failures of the data processing systems.

Additionally, to provide even further improved (and ease of) use of the hidden knowledge (e.g., structured knowledge attributes) for the downstream consumers (e.g., service technicians, applications, etc.), embodiments herein may include an inference model (e.g., a large language model) configured to generate failure prediction prompts using the hidden knowledge. Such failure prediction prompts advantageously make the hidden knowledge friendlier for human consumption, interpretation, and use (e.g., by converting the hidden knowledge into human readable descriptive natural language). Such failure prediction prompts are also advantageously customizable (e.g., to be able to generate very elaborative and detailed incident reports, very short and concise triage quick reference guides and/or checklists, or the like) to suit the user's (e.g., downstream consumer's)

preferences. Even further, training of the inference model using the hidden knowledge further improves the inference model's ability to focus on key information (e.g., relatively high or low values, or the like) and ability to filter information (e.g., filter out old information, filter missing values, filter scenarios that are not applicable to the current instance being managed by the user, or the like).

Thus, an improved computing device and/or distributed system may be obtained. The improved device and/or system may be more resilient to impairment, which may result in an improved reliability of computer-implemented services (e.g., provided by one or more members of the distributed system).

In an embodiment, a computer-implemented method for managing data processing systems based on indications of a failure is provided. The method may include: generating a structured knowledge labeled dataset using one or more structured knowledge attributes stored in a structured knowledge repository and one or more failure prediction prompts stored in a failure prediction prompt library; fine-tuning an inference model using the structured knowledge labeled dataset to obtain a trained inference model; using the trained inference model to generate a failure prediction response, the failure prediction response comprising a failure prediction and a portion of the one or more structured knowledge attributes that provide for interpretability of the failure prediction; and providing the failure prediction response to a user.

Prior to using the trained inference model to generate the failure prediction response: obtaining a failure prediction response request from the user for data stored in the structured knowledge repository, the data comprising the one or more structured knowledge attributes, and the data being usable to manage an indication of the indications of the failure for a data processing system of the data processing systems.

The one or more failure prediction prompts include at least a short readout prompt, a long readout prompt, and a knowledge-base-article-based prompt.

The inference model is a large language model (LLM) and fine-tuning the inference model using the structured knowledge labeled dataset may include implementation of a private infrastructure fine-tuning method.

The inference model is a large language model (LLM) and wherein fine-tuning the inference model using the structured knowledge labeled dataset may include implementation of a public infrastructure fine-tuning method.

The method may further include, prior to generating the failure prediction response: identifying an occurrence of the failure, the failure being of the data processing system; and based on the occurrence, using a second inference model to obtain an indication of a root cause for the failure, the structured knowledge repository being based, at least in part, on the second inference model and logs on which the second inference model is based.

The method may further include, after providing the failure prediction response:

assessing a likelihood of the root cause being accurate using the failure prediction response. In an instance of the assessing where the likelihood meets a threshold: identifying at least one remediation action based on the root cause; and performing the at least one remediation action to obtain an updated data processing system to attempt to remediate the failure.

In an embodiment, a computer-implemented method for managing data processing systems based on indications of a failure is provided. The method may include: obtaining one or more structured knowledge attributes from a structured knowledge repository; generating an instruction definition using the one or more structured knowledge attributes and one or more failure prediction prompts stored in a failure prediction prompt library; generating a failure prediction response using the instruction definition and an inference model that has not been previously trained using data stored in the structured knowledge repository; and providing the failure prediction response to a user.

Prior to generating the failure prediction response: obtaining a failure prediction response request from the user for the data stored in the structured knowledge repository, the data comprising the one or more structured knowledge attributes, and the data being usable to manage an indication of the indications of the failure for a data processing system of the data processing systems.

The instruction definition is added as a prefix to each of the one or more failure prediction prompts, and the instruction definition includes at least: a description of a task, an input comprising the one or more structured knowledge attributes, and examples of the failure prediction response based on each of the one or more failure prediction prompts.

The one or more failure prediction prompts include at least a short readout prompt, a long readout prompt, and a knowledge-base-article-based prompt.

The inference model is a large language model (LLM), and the inference model generates the failure prediction response using in-context learning techniques.

The method may further include, prior to generating the failure prediction response: identifying an occurrence of the failure, the failure being of the data processing system; and based on the occurrence, using a second inference model to obtain an indication of a root cause for the failure, the structured knowledge repository being based, at least in part, on the second inference model and logs on which the second inference model is based.

The method may further include, after providing the failure prediction response: assessing a likelihood of the root cause being accurate using the failure prediction response. In an instance of the assessing where the likelihood meets a threshold: identifying at least one remediation action based on the root cause; and performing the at least one remediation action to obtain an updated data processing system to attempt to remediate the failure.

A non-transitory media may include instructions that when executed by a processor cause any of the above computer-implemented methods to be performed.

A data processing system may include the non-transitory media and a processor, and may perform any of the above computer-implemented methods when the computer instructions are executed by the processor.

Turning to FIG. 1, a block diagram illustrating a system in accordance with an embodiment is shown. The system shown in FIG. 1 may provide computer-implemented services and may be managed by a data processing system manager (e.g., data processing system manager 110) in order to provide the computer-implemented services. The system may include data processing systems 100. Data processing systems 100 may include any number of computing devices that provide the computer-implemented services. For example, data processing systems 100 may include one or more data processing systems 100A, 100N that may independently and/or cooperatively provide the computer-implemented services. For example, all, or a portion, of data processing systems 100A-100N may provide computer-implemented services to users and/or other computing devices operably connected to data processing systems 100.

The computer-implemented services may include any type and quantity of services including, for example, database services, instant messaging services, video conferencing services, etc. Different systems may provide similar and/or different computer-implemented services. To provide the computer-implemented services, data processing systems 100 may host applications that provide these (and/or other) computer-implemented services. The applications may be hosted by one or more of data processing systems 100.

The computer-implemented services may be performed, in part, by using AI models (e.g., inference models). The inference models may, for example, be implemented with artificial neural networks, decision tress, regression analysis, and/or any other type of model usable for learning purposes. For example, data obtained from various data sources (not shown) may be used as training data (e.g., used to train the inference models to perform the computer-implemented services), and/or as ingest data (e.g., used as input to the trained inference models in order to perform the computer-implemented services).

Any of data processing systems 100 and components thereof, as well as hosted entities (e.g., applications that provide computer-implemented services, other applications that manage the operation of data processing systems 100, etc.), may be subject to undesired operation. For example, due to various operating conditions, flaws in design, and/or for other reasons, any of these hardware and/or software components may operate in a manner that diverges from nominal (e.g., desired) operation.

When operating, any of these components may generate one or more logs. A log may be a data structure that includes a representation of current and/or past operation of all or a portion of data processing systems 100, such as operational information regarding data processing systems 100. For example, the log may include descriptions of conditions encountered by a component, a time when the condition was encountered, an identifier associated with a condition and/or generator of the log, an indication of a relative level of importance or severity of the encountered conditions, and/or other types of information.

While the logs may include information regarding the current operation of data processing systems 100, the logs may not directly specify whether portions of the log (e.g., log segments) are indicative of potential undesired operation of the data processing systems 100 and/or components thereof, and/or may lack other information that may be used to manage data processing systems 100. Thus, the logs alone may not be useful for proactively addressing potential future undesirable operating conditions (e.g., component failures) of data processing systems 100, and/or causes of the potential undesired operation of data processing systems 100.

Therefore, to proactively identify and/or address potential failures of the data processing systems, the logs may be analyzed to predict future failures. For example, an inference model (e.g., trained to recognize log message patterns in historical log data of data processing systems that are related to historical failures of particular components of the data processing systems) may be used to analyze current log data generated by data processing systems to predict failures of components of the data processing system. The predicted failures (and/or additional failure information) may be provided to downstream consumers (e.g., downstream consumers 104). The downstream consumers may use the failure information to manage the data processing systems in order to prevent and/or mitigate the predicted failures and/or outcomes of the predicted failures.

Downstream consumers 104 may provide computer-implemented services to users of downstream consumers 104 and/or other computing devices operably connected to downstream consumers 104. Different downstream consumers may provide similar and/or different computer-implemented services. For example, downstream consumers 104 may include administrators and/or service technicians of the data processing systems, applications, and/or other data processing systems (e.g., that may provide computer-implemented services based on the provided failure information).

Downstream consumers 104 may include any number of downstream consumers (e.g., 104A-104N). For example, downstream consumers 104 may include one downstream consumer (e.g., 104A) or multiple downstream consumers (e.g., 104A-104N) that may individually and/or cooperatively provide all, or a portion of, the computer-implemented services (e.g., participate in and/or support the management of the data processing systems based on their predicted failures).

Downstream consumers 104 may rely on the provided failure information in order to make critical decisions (e.g., regarding data processing systems that may impact the computer-implemented services), and therefore may rely on the trustworthiness of the failure information. However, inferences (e.g., failure predictions) generated by inference models may not always be trustworthy (e.g., the inferences may be inaccurate and/or incorrect), and/or the inference models may be complex (e.g., black boxes) and may lack explainability (e.g., the ability for a human to be able to understand methods, processes, and/or decisions that an inference model utilizes in order to generate an inference). To ensure the trustworthiness of an inference, the inference may undergo manual validation (e.g., by a user), which may be time-consuming and infeasible for time-sensitive critical decisions. Therefore, automated methods of understanding the inference model in order to validate the inferences may be implemented (e.g., via explainable AI).

In general, embodiments disclosed herein may provide systems, devices, and/or methods for managing data processing systems to reduce the likelihood of the data processing systems operating in an undesired manner. A system in accordance with an embodiment may include data processing system manager 110. Data processing system manager 110 may manage the operation of data processing systems 100 and/or downstream consumers 104.

To provide its functionality, data processing system manager 110 may (i) obtain logs for hardware and/or software components of data processing systems 100, (ii) implement an inference model to predict future failures of components of data processing systems (and other related additional failure information) using the logs, (iii) extract hidden knowledge from the inference model (e.g., hidden knowledge related to the predicted future failure), (iv) store portions of the hidden knowledge in a repository for later access by downstream consumers (e.g., by users and/or applications via a query engine), and/or (v) manage and/or provide access to the repository (e.g., hidden knowledge stored within) in order to increase the downstream consumers' trust in the predicted potential future failure (e.g., by improving the understanding of the methods and/or processes performed within the inference model in order to generate the predicted potential future failure).

For example, an inference model (e.g., a deep learning model) may be trained to predict a diagnosis for a patient based on a supplied medical image of the patient (e.g., ingest data). The inference model may predict that the patient has suffered a bone fracture in the foot. The downstream consumer of the diagnosis (e.g., doctor, radiologist, etc.) may wish to validate the diagnosis to ensure the diagnosis is trustworthy. To do so, hidden knowledge may be extracted from the inference model to obtain a heatmap that may highlight the pixels of the medical image used to obtain the diagnosis. The downstream consumer may evaluate the trustworthiness of the diagnosis based on an analysis of the heat map.

For example, the downstream consumer may determine that the heatmap indicates that the model is using the correct pixels (e.g., of the medical image) to obtain the diagnosis, the downstream consumer may be more likely to trust the foot bone fracture diagnosis and/or future similar diagnoses made by the inference model. However, if the downstream consumer determines that the heatmap indicates that the model is using the incorrect pixels to obtain the diagnosis, then the downstream consumer may be less likely to trust the foot bone fracture diagnosis and/or future similar (or all) diagnoses made by the inference model, rendering the inference model impractical for providing the computer-implemented service (e.g., diagnoses).

Further, hidden knowledge may be used to identify issues with the inference model. For example, inaccurate and/or incorrect inferences may be used to identify biases in training data used to train the inference models. Therefore, hidden knowledge extracted from inference models used to provide computer-implemented services may be used to evaluate and/or improve the performance of the inference models. For example, the improved inference models may generate more trustworthy component failure predictions, and the hidden knowledge extracted from the inference models may be used to improve the interpretability of the component failure predictions.

By doing so, a system in accordance with embodiments disclosed herein may provide data processing systems having, for example, (i) decreased downtime (e.g., downtime due to hardware failure), (ii) improved user experiences by avoiding phantom slowdowns and/or pauses (e.g., due to undesired operating behavior), and/or (iii) improved computing resource availability for desired computer-implemented services (e.g., by reducing computing resource expenditures for management and/or remedial action).

Figure 3A:
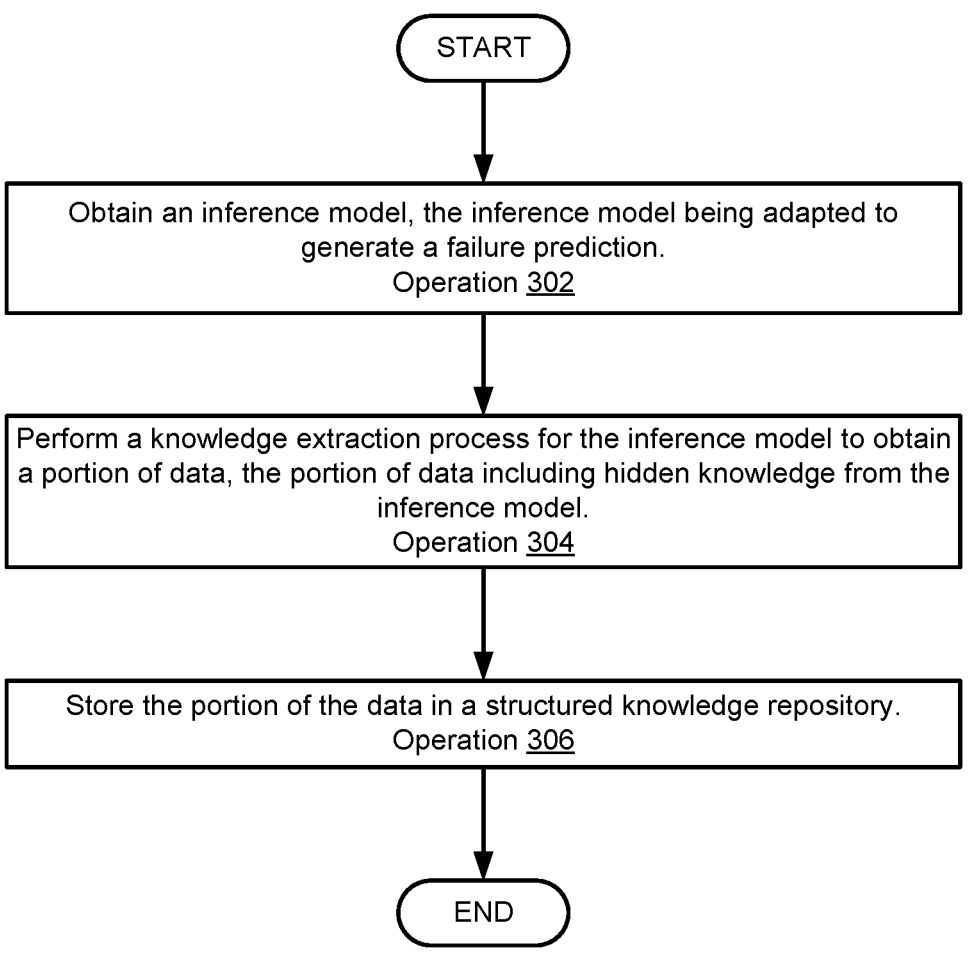
FIG. 3A shows a flow diagram illustrating a method of obtaining structured knowledge attributes in accordance with an embodiment.
Figure 3B:
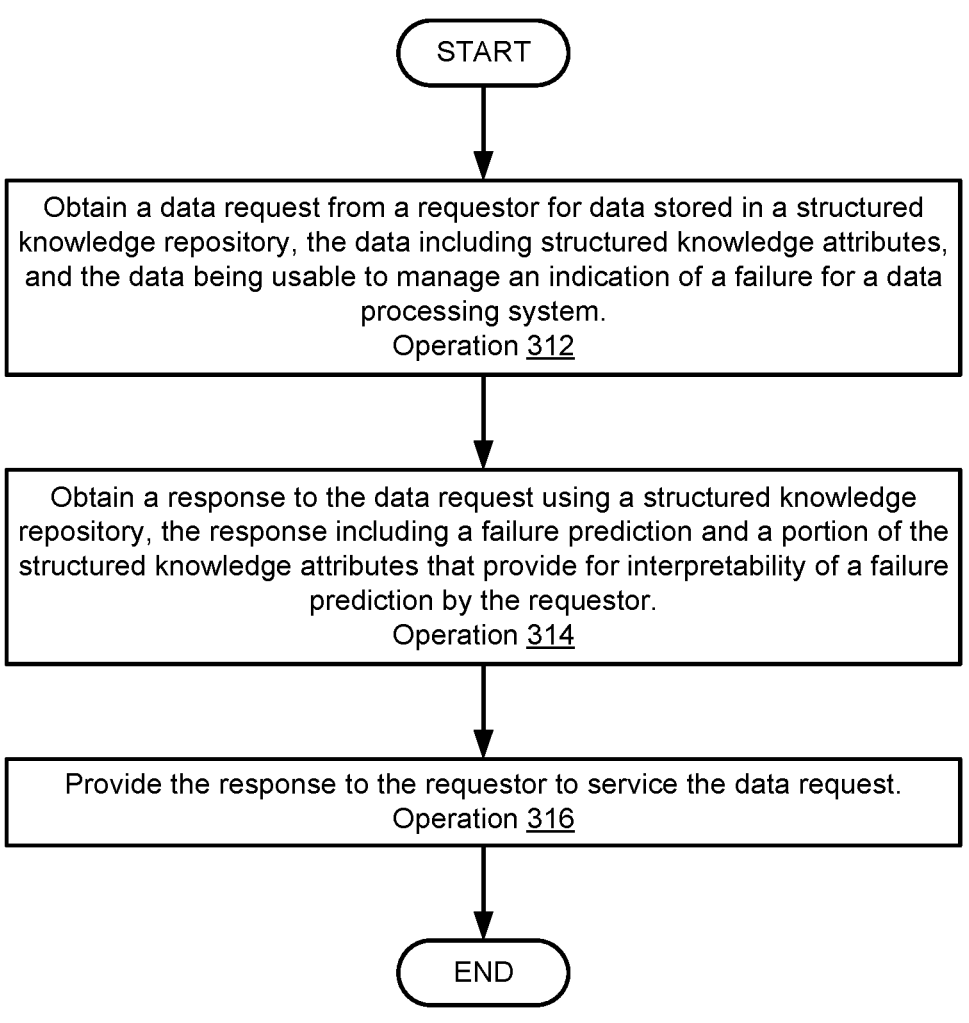
FIG. 3B shows a flow diagram illustrating a method of managing an indication of a failure of a data processing system in accordance with an embodiment.

When providing its functionality, data processing systems 100, downstream consumers 104, and/or data processing system manager 110 may perform all, or a portion, of the method and/or actions shown in FIGS. 3A-3B.

Data processing systems 100, downstream consumers 104, and/or data processing system manager 110 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 4.

In an embodiment, one or more of data processing systems 100, downstream consumers 104, and/or data processing system manager 110 are implemented using an internet of things (IoT) device, which may include a computing device. The IoT device may operate in accordance with a communication model and/or management model known to data processing systems 100, downstream consumers 104, data processing system manager 110, data sources (not shown), and/or other devices.

Any of the components illustrated in FIG. 1 may be operably connected to each other (and/or components not illustrated) with a communication system 105. In an embodiment, communication system 105 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

As discussed, the system described in FIG. 1 may be used to obtain and/or train inference models capable of predicting component failures for components of data processing systems, interpret the inference models in order to obtain additional failure information associated with the predicted component failures (e.g., to be used as training data), and/or extract hidden knowledge from the inference models in order to improve the explainability and/or trustworthiness of the inference models (e.g., and their inferences).

The processes shown in FIGS. 2A-2D may be performed by any entity shown in the system of FIG. 1 (e.g., a data manager similar to data processing system manager 110, a downstream consumer similar to downstream consumer 104A, etc.) and/or another entity without departing from embodiments disclosed herein.

Figure 2A:
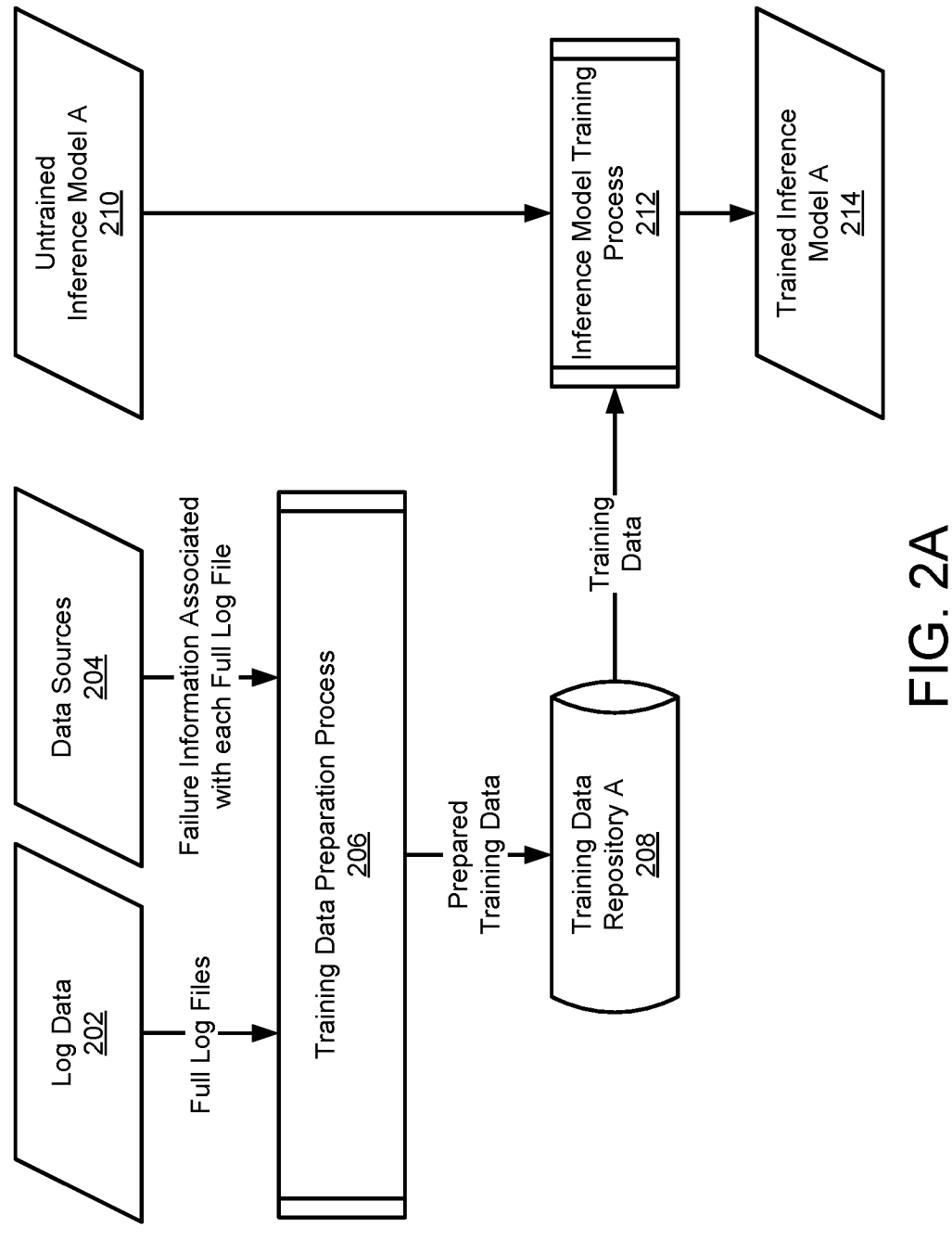
FIG. 2A shows a data flow diagram illustrating a process of obtaining a trained inference model in accordance with an embodiment.

Turning to FIG. 2A, a first data flow diagram in accordance with an embodiment is shown. The data flow diagram may illustrate the generation of inference models. The inference models may provide computer-implemented services (e.g., inference generation) for downstream consumers. A data processing system may, over time, generate inference models for various purposes. For example, inference models may generate inferences that may be used to recognize patterns, automate tasks, and/or make decisions.

The inference models may, for example, be implemented with any of model usable for learning purposes. The type of inference model used may depend on the goals of the downstream consumers and/or other factors such as (i) training dataset characteristics (e.g., data type, size and/or complexity), (ii) cost limitations (e.g., the cost to train and/or maintain the inference model), (iii) time limitations (e.g., the time to train the inference model and/or for inference generation), and/or (iv) inference characteristics (e.g., accuracy and/or inference type).

For example, a complex inference model such as a multi-layered neural network may process a large amount of complex data and generate highly accurate inferences, but may be costly to train and maintain and may have low explainability (e.g., may act as a "black box"). In contrast, a linear regression model may be a simpler, less costly inference model with high explainability, but may only be well-suited for data whose labels are linearly correlated with the selected features and may generate less accurate inferences than a neural network.

Once an inference model type is selected, the inference model must be trained using training data that may be acquired from various data sources (e.g., various data processing systems). FIG. 2A shows training data gathered from log data 202 and data sources 204. Log files from log data 202 and data from data sources 204 may be acquired from one or more data processing systems 100.

Log data 202 may be obtained from any number of data processing systems managed by data processing system manager 110. Log data 202 may include any type and quantity of logs, and may include descriptions of actions leading up to an event, and/or a description of an event (e.g., an undesirable operation and/or a normal operation). Log data 202 may be implemented with structured or unstructured data and may include any number of past logs (e.g., historical logs). These historical logs may relate to historical failure information collected from data sources 204.

Data sources 204 may include (i) systems and/or databases that store trouble tickets (e.g., helpdesk databases), (ii) a data processing system that hosts a component for which a past failure has occurred (e.g., the management controller of the data processing system), (iii) the supplier of a component for the data processing system (e.g., a manufacturer that has verified a faulty component), (iv) and/or other sources of failure information that may be associated with log data 202.

Training data preparation process 206 may collect training data such as full log files (e.g., historical log data) from log data 202, and/or failure information (e.g., types and/or times of past failures) from data sources 204. The full log files may include log patterns that may be related to past failures of data processing systems and/or components thereof, and the past failures may be associated with a time of failure.

Training data preparation process 206 may include verifying and/or performing data labeling (e.g., associating two or more data samples from the collected training data). For example, a full log file (e.g., input) may be associated with a past failure type (e.g., output). However, labeled training data may not always be reliable (e.g., a data sample may be improperly labeled by a user) and, if incorrectly labeled training data is used to train an inference model, the trained inference model may generate inaccurate inferences. Thus, the quality of training data labels may be verified as part of training data preparation process 206. For example, unreliable labels may be removed from a portion of training data and that portion of training data may be implemented as unlabeled data during training.

The prepared training data from training data preparation process 206 may be stored in training data repository A 208. Any of the training data from training data repository A 208 may relate log files from log data 202 to failure information from data sources 204, thereby including any portion of labeled data. Training data may also include unlabeled data and, thus, an association between log data 202 and data sources 204 may not be known.

Training data repository A 208 may include any number of training datasets. The training datasets may be used to train an inference model to generate a prediction (e.g., an inference) regarding a potential future failure of some component of the data processing system, based on ingested data (e.g., log data 202).

Untrained inference model A 210 may be trained using training data (e.g., from training data repository A 208). To do so, untrained inference model A 210 and the training data may be input to inference model training process 212.

Inference model training process 212 may employ machine-learning techniques such as supervised learning (e.g., for labeled training data), and/or unsupervised learning (e.g., for unlabeled data) to produce any number of trained inference models, including trained inference model A 214. The trained machine-learning models may be implemented using other modalities (e.g., semi-supervised learning, reinforced learning, associative rules, etc.). As part of the training process, the trained inference model may undergo a validation and/or testing step to improve and/or measure the reliability of generated inferences. Any number of inference models may be trained using inference model training process 212.

Trained inference model A 214 may attempt to map an input dataset to a desired output dataset (e.g., generate inferences). The inferences may be generated from ingest data that may differ from the training data that was used to train trained inference model A 214. For example, trained inference model A 214 may be used to analyze new logs (e.g., real-time logs) from a data processing system and may detect a future failure recorded in the new logs.

For example, trained inference model A 214 may be a classification inference model and may classify log files from log data 202 based on whether the log indicates a failure may occur and/or by failure type (e.g., failure classification). The failure type may indicate a component (e.g., a hardware component) of the data processing that may be subject to a future failure (e.g., is predicted to fail based on the log file).

Over time, the trained inference models may need to be updated for a variety of reasons. For example, the trained inference models may become inaccurate, may not provide desired types of inferences, etc. Consequently, trained inference models (e.g., trained inference model A 214) may be periodically replaced and/or updated.

Thus, as illustrated in FIG. 2A, the system of FIG. 1 may obtain and/or train inference models used for the detection of future failures based on log data of the data processing system. However, the detection of future failures alone may not be sufficient to determine effective solutions to manage component failures, especially in more complex cases (e.g., where multiple component failures are predicted and/or when predicted failures may be directly related). Further analysis of relationships between log files and failure information may be performed to predict additional failure information that may be used to manage the predicted future failures.

Figure 2B:
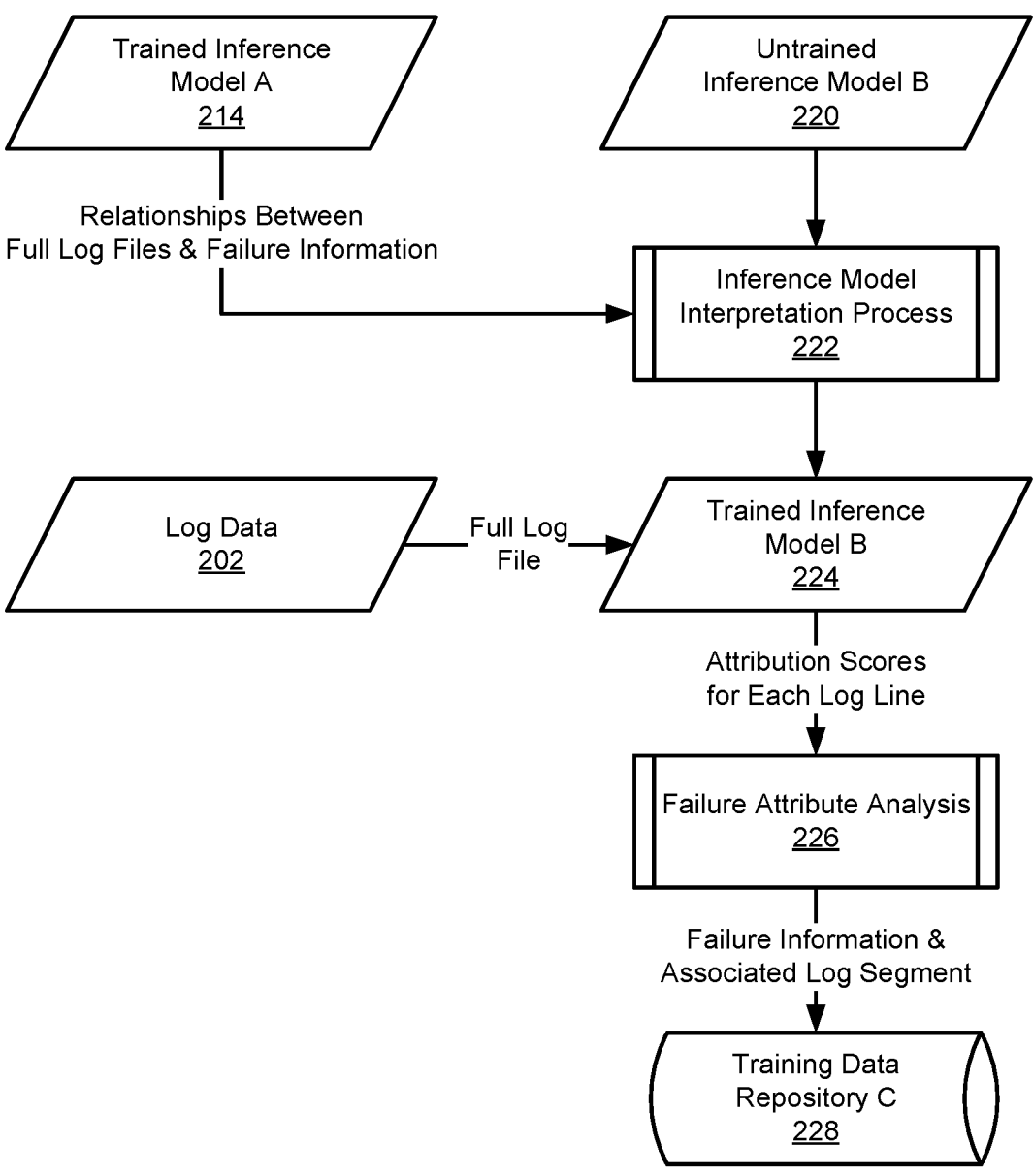
FIG. 2B shows a data flow diagram illustrating a process of obtaining training data for an inference model in accordance with an embodiment.

Turning to FIG. 2B, a second data flow diagram in accordance with an embodiment is shown. The data flow diagram may illustrate a process of obtaining training data for an inference model. The training data may be obtained through the analysis of attribution scores of portions of a log file (e.g., of log lines) that may contribute to a predicted failure (e.g., predicted by trained inference model A 214 described with respect to FIG. 2A). The training data may include additional attributes (e.g., additional failure information) related to the predicted failure such as a time-to-failure for the predicted failure.

To obtain the attribution scores, trained inference model A 214 may be interpreted using an interpretation framework during model interpretation process 222. Relationships between full log files and failure types (e.g., defined by the architecture and parameters of trained inference model A 214) may be interpreted using an inference model interpretation framework. The inference model interpretation framework may perform local feature attribution using various methods (e.g., Shapley additive explanations (SHAP), gradient-weighted class activation mapping (Grad-CAM), etc.). The feature attribution method may output the relevance (e.g., contribution) of each input feature of the inference model to an output feature (e.g., an inference generated by the inference model).

For example, local feature attribution performed on trained inference model A 214 may output an attribution score for every line of a full log file for any number of predicted failures. The attribution scores may be used to identify the portions of the log file that most impact the classification score (e.g., failure type) predicted by trained inference model A 214. A positive attribution score may indicate the amount that the log line contributes to the failure type), and a zero attribution score may indicate that the log line may have no contribution to the failure type.

As part of model interpretation process 222, untrained inference model B 220 may be trained using training data generated from model interpretation process 222 (e.g., training data that relates log lines and attribution scores for one or more failure types). Untrained inference model B 220 may be trained using a training method similar to the one described in FIG. 2A. Once trained, trained inference model B 224 may assign attribution scores to each log line of an ingested full log file obtained from log data 202. Any number of trained inference models may be generated using model interpretation process 222.

The attribution scores (e.g., for each failure type) for each log line may be input to failure attribute analysis 226. Failure attribute analysis 226 may perform a statistical analysis (e.g., computations of sums, standard-deviations, medians, and/or means) of the attribution scores for each log line of the full log file to identify log segments (e.g., smaller portions of the full log file) that contribute to one or more predicted failure types.

Some log lines of the log file may contribute to a predicted failure more than other log lines; therefore, to determine which portions of the log file contribute to a potential failure (e.g., and to predict which future failure is most likely), aggregate attribution scores may be derived. The aggregate attribution scores may be used to define a log segment (e.g., a portion of the full log file) associated with a failure type. The defined log segment may include a pattern within the log file that relates to the occurrence of a predicted failure.

For example, a cumulative sum of attribution scores may be determined for each consecutive log line of the full log file for each failure type. The cumulative sum may represent the temperature of each log line (e.g., a heat map), denoting which log lines in the log file contribute to a predicted failure type. Log lines that have lower temperature values (e.g., lower cumulative attribution scores) may not contribute significantly to a future failure (e.g., may not indicate a future failure), whereas log lines that have higher temperature values may contribute significantly to the future failure. Log segments (e.g., groups of log lines) with higher temperatures (e.g., strong indications of a future failure) may be defined using virtual markers.

Virtual markers may be placed within a log file based on multiple attribution thresholds (e.g., defined by a user and/or based on statistical analysis). The virtual markers may be positioned throughout the full log file. For example, a first virtual marker may be positioned at the first log line in the log file that has a temperature exceeding a minimum threshold, the first virtual marker indicating the beginning of a log segment. A second virtual marker may be positioned at a log line in the full log file (e.g., subsequent to the position of the first virtual marker) based on a time of failure (e.g., the time at which the predicted failure occurred). The time of failure may be supplied by data sources 204 (refer to FIG. 2A) as part of the failure information associated with the failure type. The second virtual marker may be positioned at a log line that has a timestamp that matches and/or is nearest the supplied time of failure.

A third virtual marker may be positioned between the first and second virtual markers. The third virtual marker may be positioned based on a threshold that may be determined based on a maximum aggregate score for the log file (e.g., a total cumulative sum of scores of every log line of the log segment). For example, a third virtual marker may be positioned at the first log line of the log segment that has a temperature exceeding a maximum threshold (e.g., 75% of the total cumulative sum for the segment). Any number of virtual markers may be placed within the log segment to define a portion of the log (e.g., the log segment) and any sub-portions thereof. For example, the third virtual marker may indicate an end of the log segment (e.g., when used for predicting future failures), and/or the second virtual marker may indicate an end of the log segment (e.g., when used to determine the time-to-failure).

Failure attribute analysis 226 may determine additional failure information (e.g., a time-to-failure and/or system health scores) associated with the predicted failure based on one or more virtual markers positioned within the full log file. For example, the time-to-failure may be calculated by subtracting the timestamp value at the third virtual marker from the timestamp value at the second virtual marker (e.g., the time of failure).

Data processing system health may be monitored using cumulative health scores. The health scores may be based on attribution scores determined from input logs, the attribution scores having been determined for each component (e.g., possible failure type) of the data processing systems. An aggregation function (e.g., straight sum, mean, and/or weighted sum) may be used to derive a cumulative health score. For example, attribution scores for multiple failure types may be aggregated using a weighted sum that weights integral components of a data processing system more than secondary components. The weighted sum may be normalized based on minimum and maximum attribution scores for any and/or all components. The health score of the data processing system may be used as a global indicator of the level of risk of failure of one or more data processing systems.

Failure information, such as the predicted failure (e.g., failure type), the time-to-failure, the system health score (e.g., based on the predicted failure(s)) and/or the associated log segment (e.g., defined by the first and third virtual markers) may be stored in training data repository C 228 as training data.

The training data stored in training data repository C 228 may be used to train a new inference model that may predict failure information (e.g., failure type and/or time-to-failure) based on ingested log segments (e.g., smaller portions of log data than the full log file). That is, the new inference model may predict failure information more efficiently (e.g., in less time) than trained inference model B 224 based on the new inference model's ability to provide the predictions by ingesting smaller portions of log data than trained inference model B 224.

Thus, as illustrated in FIG. 2B, the system of FIG. 1 may obtain and/or train an inference model to generate training data for use in training other inference models to generate failure information. The training data may include attribution scores for log lines of ingested full log files, and/or additional failure information (e.g., time-to-failure) associated with a predicted future failure.

Figure 2C:
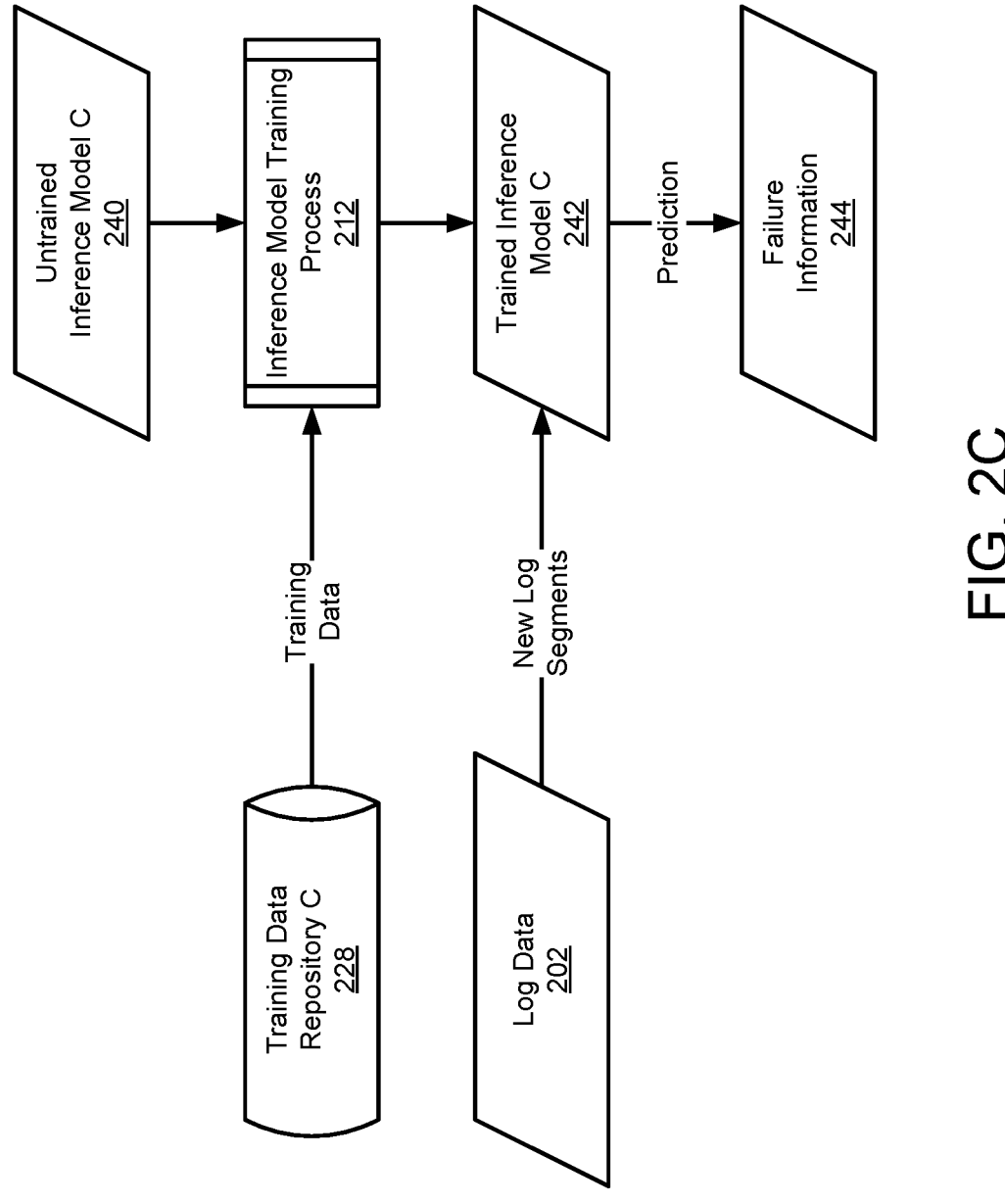
FIG. 2C shows a data flow diagram illustrating a process of obtaining failure information for a data processing system in accordance with an embodiment.

Turning to FIG. 2C, a third data flow diagram in accordance with an embodiment is shown. The data flow diagram may illustrate a process of obtaining failure information for a data processing system. To predict the failure information, an inference model may be trained using relational data stored in training data repository C 228.

Untrained inference model C 240 may undergo inference model training process 212 using training data from training data repository 228 C. The training process may be similar to the training process described with respect to FIG. 2A. The training data may relate log segments (e.g., portions of full log files) to a future failure type and/or additional failure information (e.g., time-to-failure). Trained inference model C 242 may be trained to predict failure information from ingest data (e.g., log segments).

For example, trained inference model C 242 may be a regression inference model and may predict a future failure type and the time-to-failure based on an ingested log segment. The log segment may be a portion of a full log file, and the portion may be defined by the placement of two virtual markers (as described with respect to FIG. 2B). The predictions (e.g., inferences) obtained from trained inference model C 242 may be reported (e.g., to a system administrator) as failure information 244. Trained inference model C 242 may generate the predictions based on ingestion of a new log segment from log data 202. The new log segment may be log data that is not included in training data used to train trained inference model C 242.

New log segments obtained from log data 202 may be portions of log files (e.g., real-time log files). For example, a log segment may be a 5-minute segment of a full log file that may be days or weeks long. The log segments may be more efficiently ingested (e.g., read in parallel) and analyzed by trained inference model C 242 than a full log file. This increase in efficiency may result in an effective and efficient method of predicting failure type and/or additional failure information, allowing for improved methods for managing future failures and monitoring data processing system health.

As discussed with respect to FIG. 1, improper operation of one or more components (e.g., one or more component failures) of a data processing system may negatively impact computer-implemented services provided by the data processing system. Thus, as illustrated in FIGS. 2A-2C, the system of FIG. 1 may proactively address potential improper operation of the one or more components of the data processing system by obtaining and/or implementing inference models that may predict potential component failures based on real-time log data of the data processing system.

For example, a downstream consumer may obtain a notification of a predicted component failure of a data processing system (e.g., an inference generated by an inference model). The downstream consumer may perform an action to prevent the failure, such as replacing the component that is predicted to fail. However, if the inference model is incorrect in its prediction (e.g., the inference is untrustworthy), the component replacement may be unnecessary and/or the data processing system may fail due to another component failure (e.g., not predicted by the untrustworthy inference model). Replacement of the incorrect component may result in an inefficient use of resources and/or an interruption of computer-implemented services provided by the data processing system.

Therefore, the trustworthiness of the inferences generated by the inference model and/or the inference model itself may be evaluated through hidden knowledge of the inference model. The hidden knowledge may be extracted from the inference model and/or processed (e.g., analyzed, transformed, etc.) to obtain structured knowledge attributes.

Figure 2D:
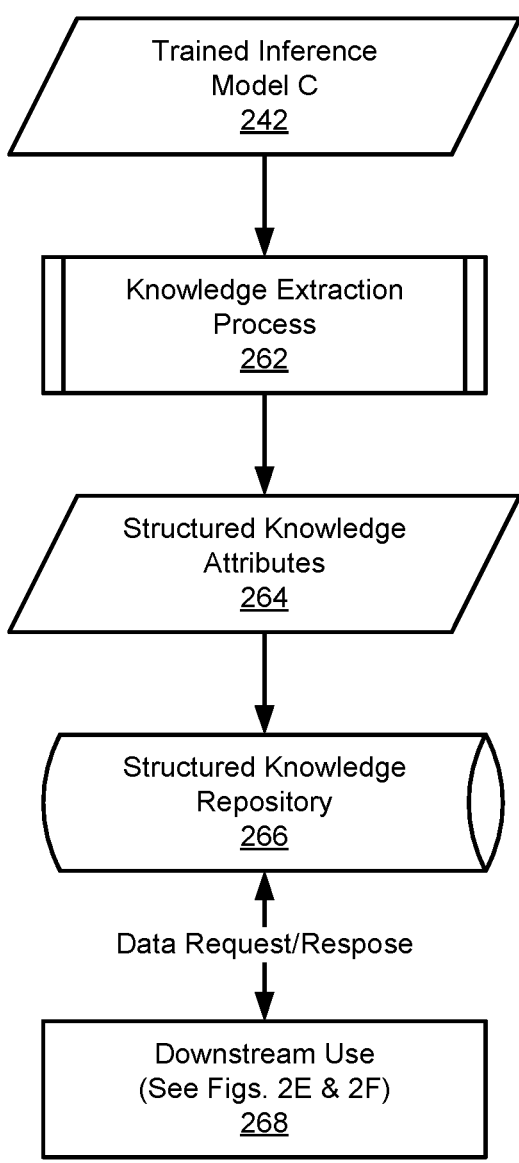
FIG. 2D shows a data flow diagram illustrating a process of obtaining structured knowledge attributes in accordance with an embodiment.

Turning to FIG. 2D, a fourth data flow diagram in accordance with an embodiment is shown. The data flow diagram may illustrate a process of obtaining structured knowledge attributes. Structured knowledge attributes may be obtained from hidden knowledge of one or more inference models (e.g., trained inference model C 242). Structured knowledge attributes (e.g., of an inference model) may refer to structured data (e.g., of a particular format) that may describe rules and/or procedures by which the inference model operates to generate inferences (e.g., outcome predictions).

Knowledge extraction process 262 may include (i) interpreting an inference model to obtain hidden knowledge (e.g., structured knowledge attributes) regarding failure predictions that may be made by the inference model, (ii) analyzing the structured knowledge attributes to obtain additional structured knowledge attributes (e.g., based on a statistical characterization of one or more potential structured knowledge attributes), and/or (iii) filtering the structured knowledge attributes and/or the additional structured knowledge attributes to obtain filtered structured knowledge attributes (e.g., structured knowledge attributes 264).

Structured knowledge attributes 264 may be based on the architecture of an inference model (e.g., trained inference model C 242) and/or the training data (e.g., historical logs of a data processing system that include activity regarding one or more historical failures).

Structured knowledge attributes 264 may include (i) input features (e.g., of training data used to train an inference model that generates a predicted failure), (ii) predicted failure information (e.g., failure type, time-to-failure, log segments indicating events preceding and/or following the predicted failure), (iii) temporal information associated with the events (e.g., absolute times usable to order the events, and/or relative event times), (iv) attribution scores (e.g., of features and/or portions of the log segments), (v) relative frequencies and/or periodicities of log segments (e.g., associated with the predicted failure information), (vi) correlated log segments (e.g., two or more log segments that are frequently associated with the predicted failure information), and/or (vii) other attributes obtained from interpretations of inference model architecture and/or additional attributes based on statistical characterizations of the other attributes.

To generate structured knowledge attributes 264, knowledge extraction process 262 may employ explainable AI techniques (e.g., SHAP, Global Interpretation via Recursive Partitioning (GIRP), permutation importance, etc.) to obtain a global interpretation the inference model (e.g., to identify its underlying operational rules).

For example, knowledge extraction process 262 may obtain trained inference model C 242. As discussed with respect to FIG. 2C, trained inference model C 242 may be trained to predict failure information for one or more data processing systems (e.g., based on log data of the one or more data processing systems). Interpreting trained inference model C 242 may include identifying relationships between features (e.g., log segments) of ingest data to trained inference model C 242 and the predicted outcomes (e.g., failure information). The identified relationships may be quantified, and the relationships and/or quantifications thereof may be included as a portion of structured knowledge attributes 264.

Knowledge extraction process 262 may extract knowledge from unstructured data sources such as knowledge base articles and/or other sources of information (e.g., that may have been used to train trained inference model C 242). Knowledge extraction process 262 may transform unstructured data to a predetermined structured format in order to generate structured knowledge attributes included as a portion of structured knowledge attributes 264.

Knowledge extraction process 262 may interpret the extracted structured knowledge attributes in order to obtain additional structured knowledge attributes. To do so, knowledge extraction process 262 may obtain a statistical characterization of one or more structured knowledge attributes. For example, the statistical characterization may include statistical properties such as means, medians, standard deviations, etc. of the structured knowledge attributes. The statistical properties may be used to estimate distributions of event (e.g., log segment) occurrences and/or patterns of events (e.g., correlated events).

The structured knowledge attributes obtained and/or generated by knowledge extraction process 262 as described above (e.g., potential structured knowledge attributes) may undergo a filtering process. One or more potential structured knowledge attributes may be excluded during the filtering process based on filtering criteria. The filtering process may be performed using an inference model (e.g., that implements filter AI, denoise AI, etc.).

For example, the filtering process may include obtaining a measure of impact (e.g., an impact score) of each of the potential structured knowledge attributes in downstream use. The potential structured knowledge attributes having impact scores that exceed a threshold may be included as a portion of structured knowledge attributes 264 (e.g., and potential structured knowledge attribute having impact scores that do not exceed the threshold may be excluded from structured knowledge attributes 264).

Once obtained, generated, and/or filtered by knowledge extraction process 262, structured knowledge attributes 264 may be provided to structured knowledge repository 266. Any number of structured knowledge attributes (e.g., based on trained inference model C 242, feature attributes of trained inference model C 242 (e.g., attribution scores), and/or training data used to train trained inference model C 242) may be stored in structured knowledge repository 266.

Structured knowledge repository 266 may store, manage, and/or provide (e.g., to downstream consumers via one or more application programming interfaces (APIs)) structured knowledge attributes 264. For example, structured knowledge attributes 264 may be managed by a relational database that may be queried by downstream consumers (e.g., by users, applications, and/or data processing systems) for downstream use.

Structured knowledge repository 266 may obtain data requests (e.g., from downstream use 268) initiated by a requestor (e.g., downstream consumers). The data requests may specify conditions impacting a data processing system. The conditions may be obtained from at least one log file (e.g., log of activity) of the data processing system. For example, the conditions may include operational information regarding one or more components of the data processing system detailed by one or more log messages of the log of activity.

The data request may include a request for data (e.g., one or more structured knowledge attributes of structured knowledge attributes 264) that may be usable to manage (e.g., by the downstream consumers) a potential failure (e.g., a predicted failure) for the data processing system. Structured knowledge repository 266 may initiate a query of the relational database that may manage structured knowledge repository 266 in order to provide a response to downstream use 268.

The response may include a failure prediction (e.g., failure information) and the requested data (e.g., one or more structured knowledge attributes of structured knowledge attributes 264) that may provide for the interpretability of the failure prediction by the requestor (e.g., the downstream consumers). The response may be obtained by downstream use 268.

Downstream use 268 may include activity of users (e.g., service technicians, administrators, etc.), applications, and/or data processing systems that may directly and/or indirectly access a portion of the data stored in structured knowledge repository 266. The portion of the data, for example, may be used to improve trained inference model C 242 (e.g., and/or its future predictions), and/or to increase the confidence that the downstream consumers have in the failure predictions generated by trained inference model C 242.

Downstream use 268 may include troubleshooting current operating conditions of the data processing system (e.g., by a service technician). The requestor (e.g., service technician) may initiate a data request for information relating to one or more of the current operating conditions in order to obtain an action set that may improve the current operating conditions of the data processing system (e.g., mitigate and/or prevent a potential failure of the data processing system).

By using information in structured knowledge repository 266, the entity performing downstream use 268 may be better informed regarding the basis for suggested courses of actions. Consequently, the entity may (i) be more willing to take the suggested courses of actions, (ii) be better able to make diagnostic decisions (e.g., in cases where multiple suggested course of actions are present, the entity may be empowered with additional information to make better informed decisions regarding which course of action to select), (iii) be able to explain to other entities why certain courses of actions have been selected, and/or (iv) accrue other benefits via downstream use 268.

Thus, as illustrated in FIG. 2D, the system of FIG. 1 may obtain structured knowledge attributes from a failure prediction inference model that may be stored in a structured knowledge repository for future access by downstream consumers. The structured knowledge attributes may be implemented in downstream use, for example, in order to improve future failure predictions (e.g., generated by inference models trained to generate failure predictions) and/or increase the confidence of downstream consumers in relying on the failure predictions. The improvements in downstream use may allow for improved remediation of future failures of data processing systems, thereby improving the reliability and/or accessibility to computer-implemented services provided by the data processing systems.

Figure 2E:
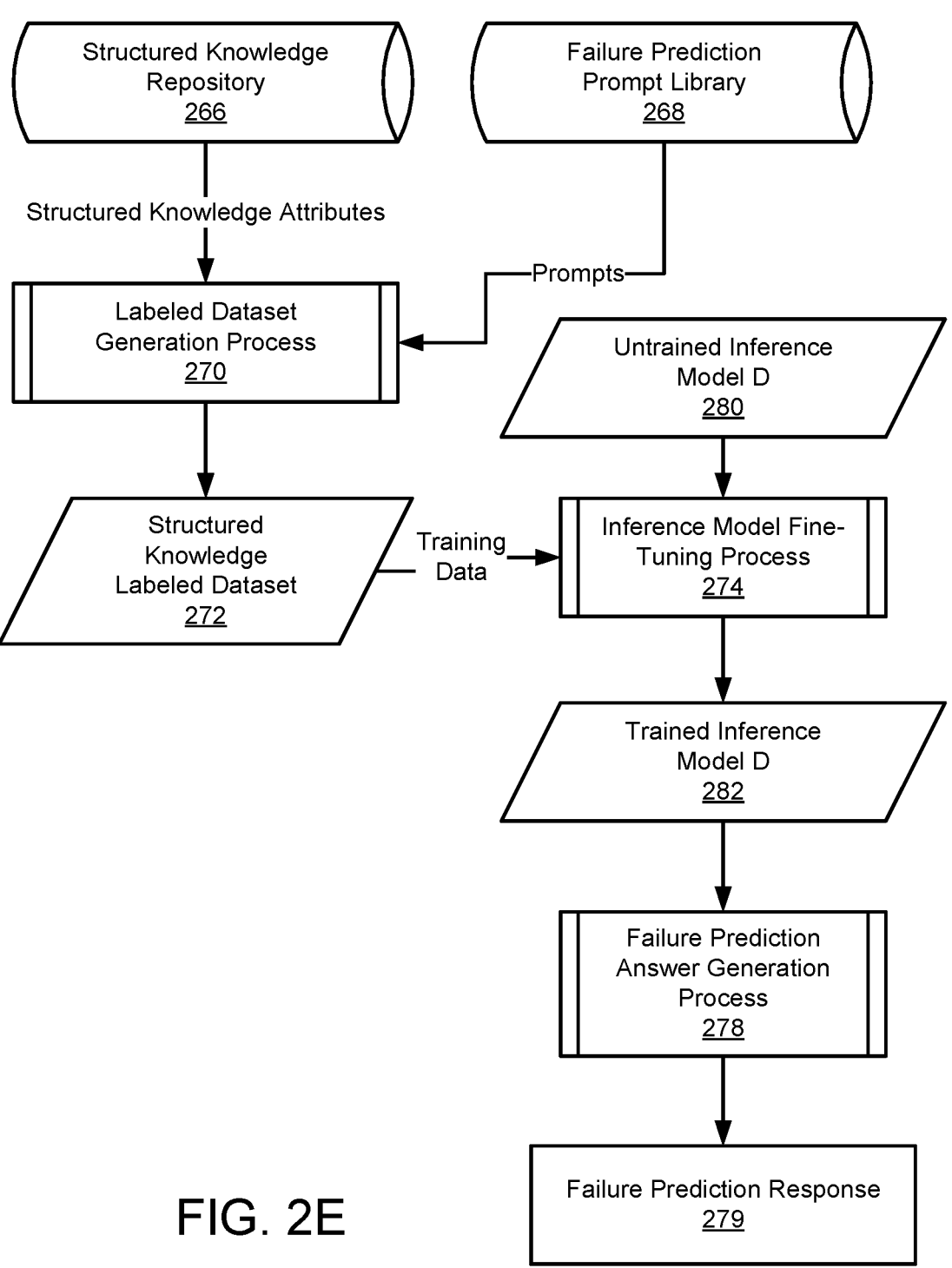
FIG. 2E shows a data flow diagram illustrating a process of obtaining failure prediction responses in accordance with an embodiment.

Turning to FIG. 2E, a fourth data flow diagram in accordance with an embodiment is shown. The data flow diagram may illustrate a process of obtaining a failure prediction response (e.g., failure prediction response 279) using the structured knowledge attributes 264 stored in the structured knowledge repository 266 discussed above in reference to FIG. 2D.

In particular, in embodiments, structured knowledge attributes 264 are obtained from structured knowledge repository 266 and ingested into labeled dataset generation process 270. In particular, the labeled dataset generation process 270 may be used to translate the structured knowledge attributes 264 into labeled data. The labeled data may then be compiled by the labeled dataset generation process 270 into a structured knowledge labeled dataset 272 that can be used to train one or more inference models.

In embodiments, the labeled dataset generation process 270 may translate the structured knowledge attributes 264 into labeled data along with one or more prompts obtained from a failure prediction prompt library 268. The failure prediction prompt library 268 may store any number of failure prediction prompts. Each failure prediction prompts may also be of any length and include any amount of detail (e.g., may be customized by a user such as a downstream consumer).

For example, one failure prediction prompt may be a short-form prompt (also referred to herein as a "short readout prompt") that includes a short and concise statement about an incidence (e.g., an indication of failure) of a data processing system. The short readout prompt may include a description such as, but not limited to: [Sequence of events], and additional information can be found in [insert relevant knowledge base (KB article) with link to KB article if link available]. In this short form readout prompt, the section of the "sequence of events" may populated using one or more of the structured knowledge attributes 264 (e.g., input features, temporal information, or the like discussed above in reference to FIG. 2D).

As another example, another failure prediction prompt may be a long-form prompt (also referred to herein as a "long readout prompt") that includes a longer readout (e.g., a more elaborative & detailed incident report) than the short-form prompt. As yet another example, another failure prediction prompt may be a knowledge-base-article-based prompt (also referred to herein as a "KB prompt") that provides a summary of a KB article (e.g., identified through using the structured knowledge attributes) relevant to an incident being managed by a user.

Although three types of failure prediction prompts are discussed above, the failure prediction prompt library 268 may be configured and/or customized (e.g., by a downstream consumer, by an administrator of the data processing manager 110 and/or data processing systems 100 of FIG. 1, etc.) to include any number and any style of failure prediction prompts, without departing from one or more embodiments disclosed herein.

In embodiments, a set of labeled data may be obtained for each of the structured knowledge attribute 264 stored in the structured knowledge repository 266. The number of labeled in each set of labeled data corresponding to a structured knowledge attribute may be equal to the number of failure prediction prompts included in the failure prediction prompt library 268. For example, if the failure prediction prompt library 268 includes four (4) types of failure prediction prompts, each set of labeled data for a corresponding structured knowledge attribute may include four (4) labeled data.

In embodiments, the labeled dataset generation process 270 may also be configured to include key information focus and invalid value handle techniques when the labeled data are being generated for the structured knowledge labeled dataset 272. For example, as part of the key information focus technique, certain information being focused on by the user in the prompts (e.g., specifying whether an event in a log segment in a high, mid, or low-frequency event) can be refined using the structured knowledge attributes 264 obtained from the structured knowledge repository 266. In particular, the key information focus technique may allow the inference model that is trained using the structured knowledge labeled dataset 272 to determine what ranges of numbers constitute high, mid, or low-frequency. The invalid value handle techniques, on the other hand, refines the labeled data to allow the inference model that is trained using the structured knowledge labeled dataset 272 to automatically determine if any information is unavailable and indicate that unavailability in the final generated failure prediction response 279.

In embodiments, the structured knowledge labeled dataset 272 is used (as part of inference model fine-tuning process 274) to train and/or fine-tune an untrained inference model D 280 (e.g., a large language model (LLM)). Although untrained inference model D 280 is shown as its own entity/component in FIG. 2E, untrained inference model D 280 may also be any of the inference models A-C discussed above inference to FIGS. 2A-2D.

Once untrained inference model D 280 is trained and/or fine-tuned using structured knowledge labeled dataset 272, a trained inference model D 282 may be obtained. In embodiments, the training and/or fine-tuning of untrained inference model D 280 may be implemented using any type of inference model training and/or fine-tuning approaches and/or techniques.

As one example, the training and/or fine-tuning may be based on a private infrastructure fine-tuning method where the entity that manages the trained inference model D 282 (as well as the data processing manager 110 of FIG. 1): (i) sets up their own infrastructure and environment (requiring a graphical processing unit (GPU)); (ii) downloads one or more open source LLMs; and/or (iii) fine-tunes the downloaded open source LLMs using the already existing functions of these LLMs. As another example, the training and/or fine-tuning may be based on a private infrastructure fine-tuning method (e.g., a cloud based fine-tuning service such as ChatGPT fine-tuning, or the like). Other types/examples of training and fine-tuning techniques may be used without departing from embodiments discussed herein.

In embodiments, the trained inference model D 282 may be configured to generate one or more failure prediction responses 279 using a failure prediction answer generation process 278 (e.g., using human readable Descriptive Natural Language generation techniques or the like). The failure prediction answer generation process 278 may include using the trained inference model D 282 to return a failure prediction response 279 using one or more structured knowledge attributes extracted (e.g., by trained inference model C of FIG. 2D) from one or more log segments included in a failure prediction response request obtained from a downstream consumer (e.g., a user for data).

Figure 2F:
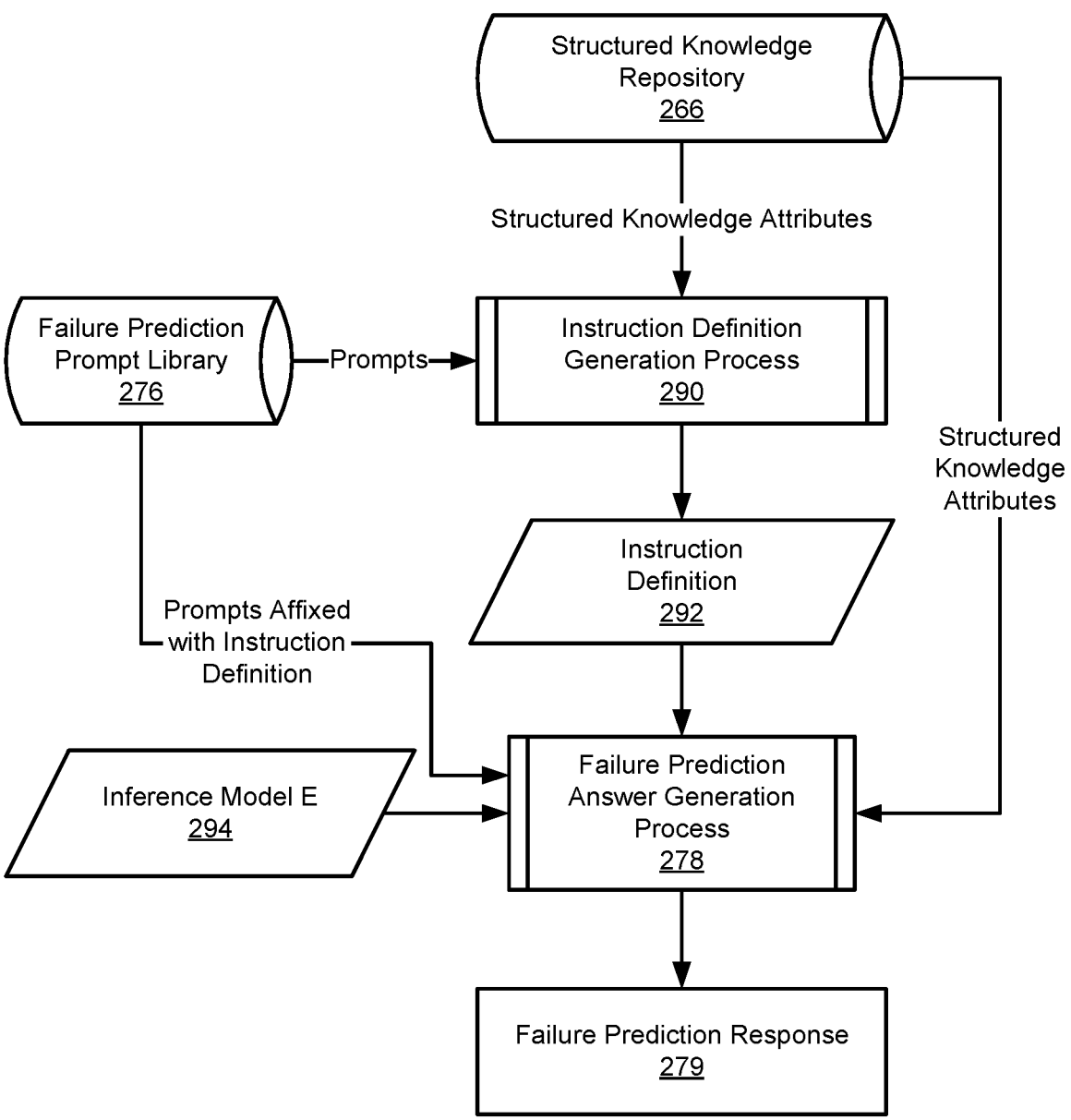
FIG. 2F shows a data flow diagram illustrating a process of obtaining failure prediction responses in accordance with an embodiment

Turning to FIG. 2F, a fifth data flow diagram in accordance with an embodiment is shown. The data flow diagram may illustrate another process of obtaining a failure prediction response (e.g., failure prediction response 279) using the structured knowledge attributes 264 stored in the structured knowledge repository 266 discussed above in reference to FIG. 2D.

As shown in FIG. 2F, structured knowledge attributes 264 (e.g., from structured knowledge repository 266) and failure prediction prompts (e.g., from failure prediction prompt library 276 (discussed above in FIG. 2E)) are ingested into an instruction definition generation process 290 to obtain an instruction definition 292.

The instruction definition 292 may be a set of instructions that may be used by one or more inference models (e.g., large language models (LLMs)) to generate one or more inferences (e.g., predictions/outputs) using in-context learning techniques.

In embodiments, the instruction definition 292 may be a file (e.g., a file containing code, algorithms, or the like) or just the set of codes, algorithms, or the like that includes at least: (i) a description of a task to be performed/executed (e.g., "This is a readout task given an input item"); (ii) an input sample (also referred to herein as "an input comprising the one or more structured knowledge attributes"); and (iii) an output sample (also referred to herein as "examples of the failure prediction response based on each of the one or more failure prediction prompts". In embodiments, the input sample may include any number of structured knowledge attributes 264 obtained from the structured knowledge repository 266. In embodiments, the output sample may include the content of any of the failure prediction prompts obtained from the failure prediction prompt library 276 and instructions specifying conditions and/or triggers for each type of failure prediction prompt being selected to be used for the generation of a failure prediction response 279.

In embodiments, the instruction definition 292 may be affixed (e.g., appended, or the like) as a prefix of each failure prediction prompt stored in the failure prediction prompt library 276. The failure prediction prompts affixed with the instruction definition 292 may be stored back into the failure prediction prompt library 276.

As further shown in FIG. 2F, the instruction definition 292 (namely, the failure prediction prompts affixed with the instruction definition 292) and an inference model E 294 (e.g., a trained and/or untrained LLM) may be used by filature prediction answer generation process 278 to generate a (or multiple) failure prediction response(s) 279. In the context of FIG. 2F, the failure prediction answer generation process 278 causes inference model E 294 to use the instruction definition (along with in-context learning techniques) to generate (e.g., infer, predict, output) one or more failure prediction responses 279 based on one or more requests received from a user (e.g., downstream consumer) to help the user identify a root cause of one or more failures experienced by/currently occurring in a data processing system.

In embodiments, using the instruction definition 292 along with the in-context learning techniques, the inference model E 294 (unlike inference model D 280 of FIG. 2E) does not need to be trained and/or fine-tuned using labeled data.

In embodiments, either process shown in FIGS. 2E and 2F may be used by a data processing system manager (e.g., data processing system manager 110 of FIG. 1) to generate the failure prediction response 279. For example, in some situations only the process in FIG. 2E may be used, in other situations only the process in FIG. 2F may be used, and in yet other situations both processes may be used (e.g., being executed in parallel).

In an embodiment, the one or more entities performing the operations shown in FIGS. 2A-2F are implemented using a processor adapted to execute computing code stored on a persistent storage that when executed by the processor performs the functionality of the system of FIG. 1 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform methods that may include (i) detecting future failures (e.g., of components of data processing systems), (ii) obtain additional failure information (e.g., associated with the detected future failures) based on short log segments from the data processing systems, (iii) extracting hidden knowledge from the inference models used to detect the future failures in order to obtain structured knowledge attributes, and/or (iv) managing (e.g., providing) the structured knowledge attributes for downstream use (e.g., for use in evaluating and/or increasing the trustworthiness the inference models used to detect the future failures).

FIGS. 3A-3B illustrate methods that may be performed by the components of FIG. 1. In the diagrams discussed below and shown in FIGS. 3A-3B, any of the operations may be repeated, performed in different orders, and/or performed in parallel with or in a partially overlapping in time manner with other operations. The methods described with respect to FIGS. 3A-3B may be performed by a data processing system, and/or another device.

Turning to FIG. 3A, a flow diagram illustrating a method of obtaining structured knowledge attributes is shown in accordance with an embodiment. The method may be performed by the system of FIG. 1. The following operations (e.g., 302-306) may be performed prior to obtaining a data request, and/or may be performed as preparation steps for managing a data processing system based on indications of a failure (discussed further in operation 312 of FIG. 3B).

At operation 302, an inference model adapted to generate a failure prediction (e.g., of a data processing system) may be obtained. The inference model may be obtained by (i) reading the inference model from storage, (ii) receiving the inference model from another device, and/or (iii) generating the inference model, for example, by programming a data processing system and/or another device.

The inference model may be a particular type of inference model, such as a logistic regression model, decision tree, random forest, etc. The inference model may be trained (e.g., adapted) to generate a failure prediction for a data processing system upon ingesting (e.g., real-time) log data of the data processing system. To train the inference model, training data may be generated based on one or more inference models, and/or a training process may be performed using the training data (as described with respect to FIGS. 2A-2C).

For example, a first set of training data may relate historical log data to historical failure data. In other words, the historical failure data may indicate types of past failures of data processing systems associated with the historical log data. A first inference model may be trained using the first set of training data and a method similar to that described with respect to FIG. 2A. Once trained, the first inference model may be trained to generalize relationships defined by the historical log data with associated types of past failures (e.g., historical failures) of data processing systems. In other words, the first inference model (e.g., trained inference model A 214) may generate a failure prediction (e.g., a failure type) for a data processing system based on ingested log data of the processing system.

A second inference model may be obtained based on the first inference model using an inference model interpretation framework, in a process similar to that described with respect to FIG. 2B. The second inference model may be trained to generate a failure prediction and attribution scores associated with each log line of ingested historical log data. The attribution scores may be based on interpretations of the first trained inference model and the interpretations may indicate levels of contribution of the log lines of the historical log data to occurrences of historical failures. Each of the occurrences of the historical failures may be associated with the portion of the log lines (e.g., the log segment) corresponding to the historical failures.

The attribution scores may be analyzed using a process similar to failure attribute analysis 226 (refer to the discussion of FIG. 2B) to generate additional failure information (e.g., times-to-failures) for a predicted failure. As part of this analysis, the attribution scores may be used to define virtual markers that may further define the log segments that relate to the predicted failure type.

The predictions and related ingest data (e.g., the defined log segments) generated by the second inference model may be collected and stored as a second set of training data. The second set of training data may associate a defined log segment, a failure prediction (e.g., one or more failure types) and/or additional failure information (e.g., time-to-failure). Thus, the second set of training data may be used to train the inference model (e.g., the inference model being obtained in operation 302) to predict failure information (e.g., failure type and time-to-failure) based on smaller portions of new ingest data (e.g., new log segments). An inference model training process that may be used to train the third inference model is described with respect to FIG. 2C.

At operation 304, a knowledge extraction process may be performed for the inference model to obtain a portion of data. The knowledge extraction process may be performed, for example, by (i) interpreting the inference model using an explainability method to obtain structured knowledge attributes (e.g., based on the hidden knowledge of the inference model) relating to failure events of a data processing system, (ii) analyzing the structured knowledge attributes to obtain additional structured knowledge attributes, and/or (iii) filtering a set of structured knowledge attributes to exclude one or more structured knowledge attributes from the set.

To interpret the inference model, an explainable AI technique (e.g., interpretation tool) may be implemented using the inference model. For example, a local explainability tool (e.g., SHAP) may use the inference model to generate local explanations (e.g., explanations for each failure prediction of a set of failure predictions made by the inference model), which may be combined to obtain a global explanation (e.g., hidden knowledge) for all failure predictions of the inference model.

The global interpretation of the inference model may describe global relationships between features of the inference model and/or how the features interact with one another. Structured knowledge attributes obtained via interpretation may include, for example, (i) predicted failure information (e.g., failure predictions (failure types), times-to-failures, and/or log segments associated with the failure predictions), (ii) input features of the inference model and/or their importance (e.g., attribution scores), and/or (iii) temporal information (e.g., times at which the log segments appear in the log data, times of predicted failures, times of virtual markers, etc.) and/or their relationships with one another (e.g., relative times).

The hidden knowledge (e.g., structured knowledge attributes) may be enriched through analysis, for example, using one or more methods of statistical analysis. For example, statistical characterization of a portion of the structured knowledge attributes may be obtained and/or retained as an additional structured knowledge attribute. Structured knowledge attributes based on a statistical characterization of a portion of the structured knowledge attributes may include, for example, (i) an ordering of log segments (e.g., a most likely order of log segments that may lead to a failure type, based on an estimated distribution of the orders), (ii) a relative frequency and/or periodicity of log segments (e.g., associated with a failure type), (iii) average relative times of log segments, and/or (iv) correlated log segments (e.g., log segments that are statistically likely to be associated with one another and a failure type).

A set of potential structured knowledge attributes (e.g., the structured knowledge attributes obtained via the interpretation and/or analysis portions of the knowledge extraction process) may be filtered. The filtering process may include excluding one or more potential structured knowledge attributes from the set of potential structured knowledge attributes. For example, the filtering process may be performed by (i) obtaining (e.g., generating) and impact score for each of the potential structured knowledge attributes, (ii) ranking the potential structured knowledge attributes by impact score, and/or (iii) selecting one or more higher-ranked potential structured knowledge attributes in order to obtain filtered structured knowledge attributes.

The impact score may be generated, for example, by obtaining attribution scores for each (type of) potential structured knowledge attribute in downstream use. The attribution scores may describe relative levels of historical contribution (e.g., impact) of the type of potential structured knowledge attributes to outcomes of their downstream use. For example, if a potential structured knowledge attribute is associated with an attribution score (e.g., impact score) lower than a threshold (e.g., defined by a user), then the potential structured knowledge attribute may not significantly contribute to (e.g., impact) its downstream use and may therefore be excluded from the filtered structured knowledge attributes.

Thus, the portion of the data obtained by performing the knowledge extraction process may include a failure prediction and hidden knowledge (e.g., structured knowledge attributes obtained via interpretation, analysis and/or filtering processes) from the inference model. A portion of the structured knowledge attributes may be based on the hidden knowledge of the inference model.

The knowledge extraction process may be performed by a third party; therefore, the portion of the data (e.g., structured knowledge attributes relating to failure predictions of the inference model) may be obtained by receiving a transmission of the structured knowledge attributes and/or other related information, via the third party.

At operation 306, the portion of the data may be stored in the structured knowledge repository. The portion of the data may be stored by (i) notifying a data processing system (e.g., managing the structured knowledge repository) of incoming data and any information relevant to storing the portion of the data (e.g., data sizes, data identifiers, etc.), (ii) transmitting the portion of the data (e.g., structured knowledge attributes) to a storage device (e.g., the structured knowledge repository), and/or (iii) transforming the data (e.g., into a database format). The notification and/or transmission of the portion of the data may be performed via network communications between a data processing system manager and other devices. The portion of the data may be stored in the structured knowledge repository for later access by downstream consumers (e.g., in order to manage the operation of data processing systems).

The method may end following operation 306.

Thus, as illustrated above, embodiments disclosed herein may provide systems and methods usable to obtain structured knowledge attributes based on hidden data of inference models trained to predict failures of data processing systems. The structured knowledge attributes may be used to gain insight into the processes and/or methods by which the inference models generate predicted outcomes (e.g., component failures). The structured knowledge attributes may be stored (e.g., in a structured knowledge repository) and/or made available to downstream consumers who may use the data to improve the management and/or use of both the inference models and/or their predicted outcomes.

Turning to FIG. 3B, a flow diagram illustrating a method of managing an indication of a failure of a data processing system is shown in accordance with an embodiment. The method may be performed by the system of FIG. 1.

At operation 312, a data request from a requestor for data stored in a structured knowledge repository is obtained. The data request may be obtained by (i) reading the data request from storage, (ii) receiving the data request from another device (e.g., the data request being initiated by the requestor) via network communications between the data processing system manager and the device, and/or (iii) generating the data request.

For example, the data request may be generated by a downstream consumer (e.g., a service technician) and/or a data processing system (e.g., based on a query from a user operating the data processing system). The data request may include data identifiers (e.g., key words) for data stored in the structured knowledge repository (e.g., as part of a database query). The requested data may include structured knowledge attributes (e.g., regarding components of a data processing system and/or a failure prediction thereof), and may be usable to manage an indication of a failure (e.g., a failure prediction) for the data processing system by the downstream consumer.

At operation 314, a response to the data request is obtained using the structured knowledge repository. The response may be obtained by (i) reading the response from storage, (ii) receiving the response from another device (e.g., via network communications between the data processing system manager and the device), and/or (iii) generating the data request.

For example, the data request may be generated by (i) identifying a failure prediction (e.g., obtained from the inference model that was obtained in operation 302 of FIG. 2A) for the data processing system, and/or (ii) identifying one or more structured knowledge attribute associated with the failure prediction. The associated structured knowledge attribute(s) may be identified via a database query of the structured knowledge repository (e.g., using one or more database field identifiers, provided by the downstream consumer).

The response may include a failure prediction and a portion of the structured knowledge attributes stored in the structured knowledge repository (e.g., the portion that provides for interpretability of the failure prediction by the downstream consumer). As discussed with respect to FIG. 2C, the structured knowledge attributes included in the response may specify conditions impacting the data processing system (e.g., described by log messages obtained from at least one log of activity of the data processing system). The conditions may include, for example, operational statistics, activity data, errors, software failures, and/or other information relevant for troubleshooting, mitigating and/or preventing data processing system infrastructure issues.

At operation 316, the response may be provided to the requestor to service the data request. The response may be provided by transmitting the response to the requestor (e.g., the downstream consumer). The response may be used (e.g., by the downstream consumer) to provide a computer-implemented service.

For example, downstream consumer may compare the conditions impacting the data processing system with the conditions specified by the structured knowledge attributes in order to determine whether the failure prediction is trustworthy. If the failure prediction is trustworthy, then the downstream consumer may perform an action set to mitigate the predicted failure. Otherwise, if the failure prediction is untrustworthy, then the downstream consumer may identify and/or perform an action set to troubleshoot the current operating conditions of the data processing system (e.g., return to operation 312 and generate a new data request including new key words for use in querying the database managing the structured knowledge repository).

For example, if the failure prediction is trustworthy, the action set may include (i) transferring workloads from the data processing system to other data processing systems, (ii) disabling a function of a data processing system, (iii) disabling a hardware and/or software component of the data processing system, (iv) replacing one or more components of the data processing system, and/or (v) performing other actions that may reduce the likelihood of the data processing system being impaired in the future (e.g., to avoid a potential future undesired operation), allow administrators or other persons to locate the potential source and/or time of initiation of an issue that may lead to the potential future undesired operation, and/or for other purposes.

The method may end following operation 316.

Turning to FIG. 3C, a flow diagram illustrating a method of obtaining failure prediction responses in accordance with an embodiment. The method may be performed by the system of FIG. 1. Certain operations in FIG. 3C may be omitted, and certain operations in FIG. 3C may be executed in any order (e.g., not in the specific order shown in FIG. 3C).

In operation 360, as discussed above in reference to FIG. 2E, a structured knowledge labeled dataset (e.g., the structured knowledge labeled dataset 272 of FIG. 2E) may be generated. The structured knowledge labeled dataset may be generated using, for example: one or more structured knowledge attributes stored in a structured knowledge repository, and one or more failure prediction prompts stored in a failure prediction prompt library.

In operation 362, as discussed above in reference to FIG. 2E, the inference model may be fine-tuned (e.g., trained) using the using the structured knowledge labeled dataset to obtain a trained inference model (e.g., trained inference model D 282 of FIG. 2E).

In operation 364, the trained inference model may be used to generate a failure prediction response in response to a failure analysis request from a user to identify a root cause of a failure of a data processing system.

In embodiments, prior to using the trained inference model to generate the failure prediction response, a failure prediction response request may be obtained (e.g., received) from a user (e.g., a downstream consumer) of a data processing system (e.g., 100A of FIG. 1) of the data processing system (e.g., 100 of FIG. 1). The failure prediction response request may include one or more log segments (e.g., log data 202 of FIG. 2A) from a data processing system that is exhibiting indications of failure (e.g., one or more errors and/or issues).

The failure prediction response request may include a request for data stored in the structured knowledge repository where the data includes one or more structured knowledge attributes stored in the structured knowledge repository. The data stored in the structured knowledge repository is usable to manage an indication of the indications of the failure for the data processing system. Said another way, the failure prediction response request is a request for a failure prediction (e.g., in the form of the failure prediction response and generated based on the structured knowledge attributes) for the user to understand what is causing (e.g., a root cause of) the indications of failure for the data processing system.

In operation 366, the failure prediction response is provided (e.g., displayed on a display) to the user to enable the user to determine the root cause and to enable the user to initiate remediations for the failure.

More specifically, in some embodiments, prior to generating the failure prediction response, an occurrence of the failure (e.g., that is part of the indications of failure) of the data processing system may be identified by the user. Based on identifying the occurrence of the failure, the user may use an inference model (e.g., any of trained inference models A-C of FIGS. 2A-2D) to obtain an indication of a root cause for the failure where the structured knowledge repository is based, at least in part, on this inference model and logs on which this inference model is based (e.g., see above discussion in FIGS. 2A-2D).

After providing the failure prediction response, the user (or a computing device configured by the user) may assess a likelihood of the root cause being accurate using the failure prediction response. In an instance of the assessing where the likelihood meets a threshold, the user or a computing device configured by the user) may identify at least one remediation action based on the root cause and perform the at least one remediation action to obtain an updated data processing system to attempt to remediate the failure of the data processing system.

The method may end following operation 366.

Figure 3D:
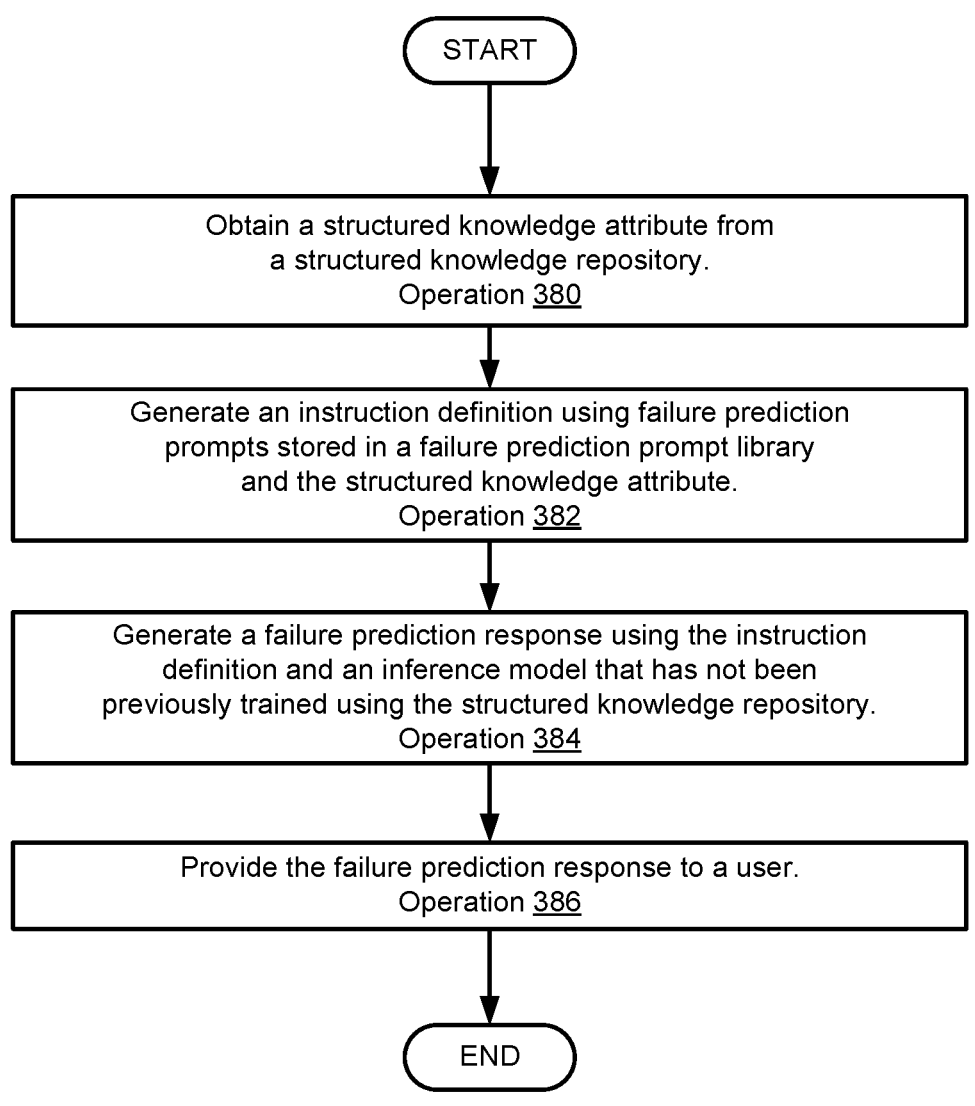
FIG. 3D shows a flow diagram illustrating a method of obtaining failure prediction responses in accordance with an embodiment

Turning to FIG. 3D, a flow diagram illustrating a method of obtaining failure prediction responses in accordance with an embodiment. The method may be performed by the system of FIG. 1. Certain operations in FIG. 3D may be omitted, and certain operations in FIG. 3D may be executed in any order (e.g., not in the specific order shown in FIG. 3C).

In operation 380, one or more structured knowledge attributes may be obtained from a structured knowledge repository (e.g., in preparation for generating an instruction definition).

In operation 382, as discussed above in reference to FIG. 2F, an instruction definition is generated using failure prediction prompts (e.g., as the output sample(s) of the instruction definition) stored in a failure prediction prompt library and the one or more structured knowledge attributes (e.g., as the input sample(s) of the instruction definition) obtained in operation 380.

In embodiments, the generated instruction definition may be affixed to one or more of the failure prediction prompts stored in the failure prediction prompt library.

In operation 384, a failure prediction response is generated using the instruction definition (namely, the instruction definition affixed failure prediction prompts) and an inference model that has not yet been trained using the structured knowledge repository. In embodiments, the inference model is not trained using any labeled data generated using data stored in the structured knowledge repository (e.g., the structured knowledge attributes). Instead, the inference model is trained using the instruction definition affixed failure prediction prompts in combination with in-context learning techniques.

Similar to above operation 364 of FIG. 3C, in operation 384 of FIG. 3D, a failure prediction response request may be obtained from a user. As discussed above, the failure prediction response request may be a request for a failure prediction (e.g., in the form of the failure prediction response and generated based on the structured knowledge attributes) for the user to understand what is causing (e.g., a root cause of) one or more indications of failure for a data processing system.

In operation 386, a failure prediction response is provided (e.g., displayed on a display) to a user. In particular, the failure prediction response may be provided to the user that submitted the failure prediction response request.

Also similar to the method of FIG. 3C, in some embodiments, prior to generating the failure prediction response, an occurrence of a failure (e.g., that is part of the indications of failure) of the data processing system may be identified by the user. Based on identifying the occurrence of the failure, the user may use an inference model (e.g., any of trained inference models A-C of FIGS. 2A-2D) to obtain an indication of a root cause for the failure where the structured knowledge repository is based, at least in part, on this inference model and logs on which this inference model is based (e.g., see above discussion in FIGS. 2A-2D).

After providing the failure prediction response, the user (or a computing device configured by the user) may assess a likelihood of the root cause being accurate using the failure prediction response generated in operation 386. In an instance of the assessing where the likelihood meets a threshold, the user or a computing device configured by the user) may identify at least one remediation action based on the root cause and perform the at least one remediation action to obtain an updated data processing system to attempt to remediate the failure of the data processing system.

The method may end following operation 386.

Thus, as illustrated above, embodiments disclosed herein may provide systems and methods usable to manage data processing systems based on indications of a failure (e.g., failure predictions obtained from inference models trained to predict failures for the data processing systems). The data processing systems may be managed by downstream consumers and/or users of computer-implemented services provided by the downstream consumers. Hidden knowledge extracted from the inference models in the form of structured knowledge attributes may be usable to interpret (e.g., validate and/or troubleshoot) the current operating conditions and/or predicted failures of the data processing systems. The structured knowledge attributes may be stored in a structured knowledge repository for continuous access by downstream consumers in order to improve the trustworthiness of the inference models and their predictions, increasing the likelihood of mitigating and/or preventing of data processing system failures.

Thus, embodiments disclosed herein may provide an improved computing device that is able to extract useful information from inference models, usable for management purposes. Further, the disclosed process may facilitate identification of relationships that a person may easily overlook. Accordingly, the disclosed process provides for both an embodiment in computing technology and an improved method for device management. Rather than relying on a person's intuition or expert knowledge, an automated process for analysis may be provided.

Figure 4:
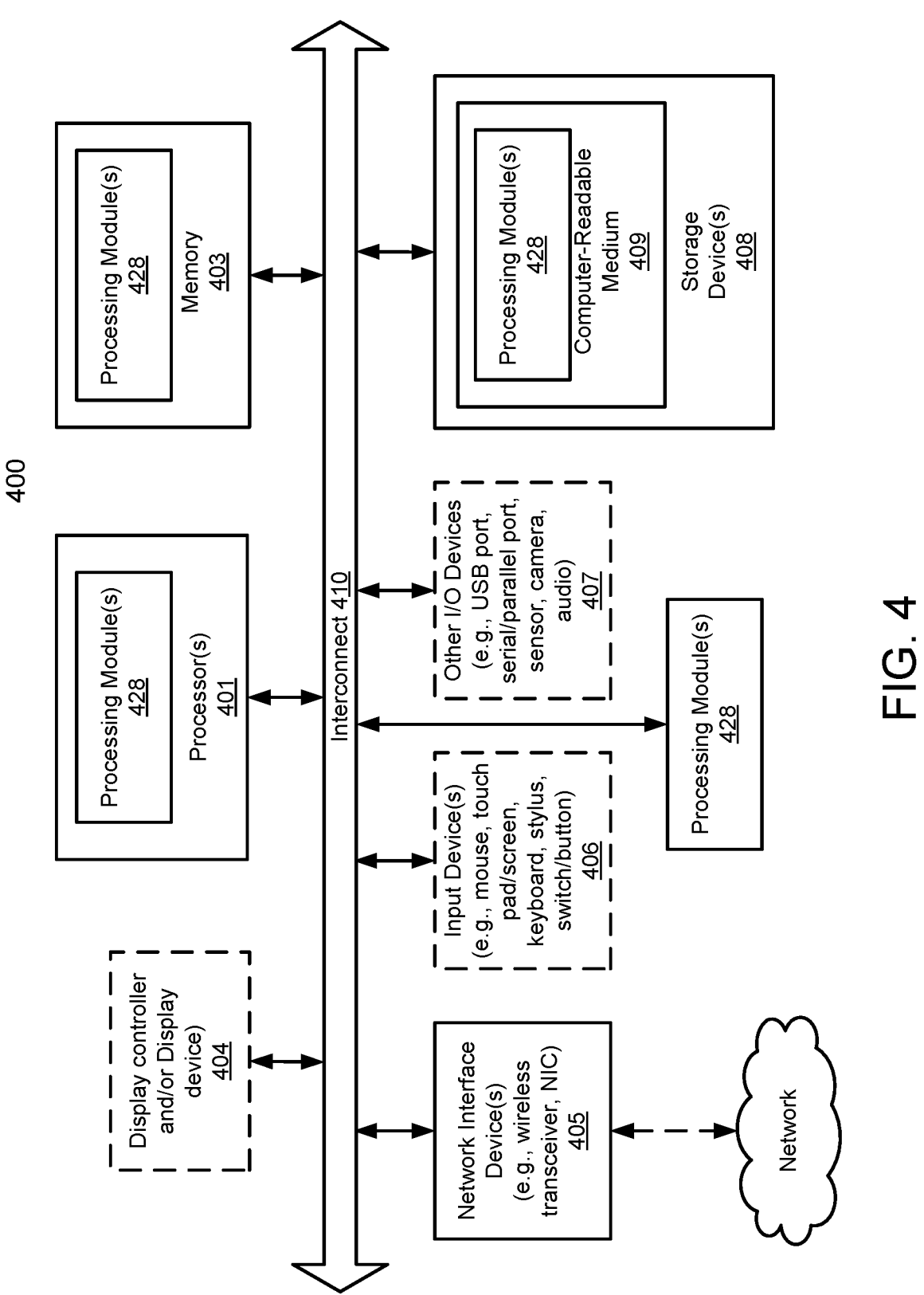
FIG. 4 shows a block diagram illustrating a data processing system in accordance with an embodiment.

Any of the components illustrated in FIGS. 1-3D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets.

Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing failures of data processing systems, comprising and by a data processing system manager configured to manage the data processing systems:

generating a structured knowledge labeled dataset using:

one or more structured knowledge attributes stored in a structured knowledge repository, the one or more structured knowledge attributes being extracted from an architecture of a trained machine learning model, the architecture controls how the trained machine learning model generates inferences, and one or more failure prediction prompts stored in a failure prediction prompt library;

fine-tuning an inference model using the structured knowledge labeled dataset to obtain a trained inference model;

using the trained inference model to generate a failure prediction response, the failure prediction response comprising a failure prediction and a portion of the one or more structured knowledge attributes that provide for interpretability of the failure prediction, the failure prediction being one of the inferences; and providing the failure prediction response to a user, wherein prior to generating the structured knowledge labeled dataset, the method further comprises:

extracting, using one or more techniques comprising explainable artificial intelligence (AI) techniques, the one or more structured knowledge attributes from the architecture of trained machine learning model; and storing the one or more structured knowledge attributes extracted from trained machine learning model into the structured knowledge repository.

2. The method of claim 1, wherein prior to using the trained inference model to generate the failure prediction response:

obtaining a failure prediction response request from the user for data stored in the structured knowledge repository, the data comprising the one or more structured knowledge attributes, and the data being usable to manage an indication of failure for a data processing system of the data processing systems.

3. The method of claim 2, wherein the one or more failure prediction prompts include at least a short readout prompt, a long readout prompt, and a knowledge-base-article-based prompt.

4. The method of claim 3, wherein the inference model is a large language model (LLM), and wherein fine-tuning the inference model using the structured knowledge labeled dataset comprises implementation of a private infrastructure fine-tuning method.

5. The method of claim 3, wherein the inference model is a large language model (LLM), and wherein fine-tuning the inference model using the structured knowledge labeled dataset comprises implementation of a public infrastructure fine-tuning method.

6. The method of claim 2, further comprising:

prior to generating the failure prediction response:

identifying an occurrence of the indication of failure for the data processing system; and based on the occurrence, using the inference model to obtain an indication of a root cause for the failure, the structured knowledge repository being based, at least in part, on the inference model and logs on which the inference model is based, the inference model being the trained machine learning model that generates the failure prediction and the failure prediction response, and the indication of the root cause being specified in the failure prediction.

7. The method of claim 6, further comprising:

after providing the failure prediction response:

assessing a likelihood of the root cause being accurate using the failure prediction response; and in an instance of the assessing where the likelihood meets a threshold:

identifying at least one remediation action based on the root cause; and performing the at least one remediation action to obtain an updated data processing system to attempt to remediate the failure.

8. The method of claim 1, wherein the architecture of the trained machine learning model is hidden from a requestor of the failure prediction response, the requestor being the user, and the portion of the one or more structured knowledge attributes that provide for interpretability of the failure prediction further provides visibility for the user into understanding how and why the trained machine learning model generated the failure prediction of the failure prediction response, using the architecture, in a manner that the trained machine learning model generated the failure prediction while the architecture of the trained machine learning model remains hidden from the user.

9. The method of claim 1, wherein the one or more structured knowledge attributes comprise parameters on which the trained machine learning model is trained to generate the inferences.

10. The method of claim 9, wherein the one or more structured knowledge attributes further comprise relationships between components of the trained machine learning model, the components comprising at least input features of data ingested into the trained machine learning model, the inferences generated by the trained machine learning model, and one or more rules followed by the trained machine learning model to generate the inferences.

11. The method of claim 1, wherein the architecture of the trained machine learning model comprises at least information regarding one or more other trained machine learning models that were used to train the trained machine learning model and regarding respective other architectures of each of the one or more other trained machine learning models.

12. A non-transitory machine-readable medium having instructions stored therein, which when executed by a processor of a data processing system manager configured to manage data processing systems, cause the data processing system manager to perform operations for managing failures of the data processing systems, the operations comprising:

generating a structured knowledge labeled dataset using:

one or more structured knowledge attributes stored in a structured knowledge repository, the one or more structured knowledge attributes being extracted from an architecture of a trained machine learning model, the architecture controls how the trained machine learning model generates inferences, and one or more failure prediction prompts stored in a failure prediction prompt library;

fine-tuning an inference model using the structured knowledge labeled dataset to obtain a trained inference model;

using the trained inference model to generate a failure prediction response, the failure prediction response comprising a failure prediction and a portion of the one or more structured knowledge attributes that provide for interpretability of the failure prediction, the failure prediction being one of the inferences; and providing the failure prediction response to a user wherein prior to generating the structured knowledge labeled dataset, the operations further comprise:

extracting, using one or more techniques comprising explainable artificial intelligence (AI) techniques, the one or more structured knowledge attributes from the architecture of trained machine learning model; and storing the one or more structured knowledge attributes extracted from trained machine learning model into the structured knowledge repository.

13. The non-transitory machine-readable medium of claim 12, wherein prior to using the trained inference model to generate the failure prediction response, the operations further comprise:

obtaining a failure prediction response request from the user for data stored in the structured knowledge repository, the data comprising the one or more structured knowledge attributes, and the data being usable to manage an indication of failure for a data processing system of the data processing systems.

14. The non-transitory machine-readable medium of claim 13, wherein the one or more failure prediction prompts include at least a short readout prompt, a long readout prompt, and a knowledge-base-article-based prompt.

15. The non-transitory machine-readable medium of claim 14, wherein the inference model is a large language model (LLM), and wherein fine-tuning the inference model using the structured knowledge labeled dataset comprises implementation of a private infrastructure fine-tuning method.

16. The non-transitory machine-readable medium of claim 14, wherein the inference model is a large language model (LLM), and wherein fine-tuning the inference model using the structured knowledge labeled dataset comprises implementation of a public infrastructure fine-tuning method.

17. A data processing system manager, comprising:

a processor; and a memory coupled to the processor to store instructions, which when executed by the processor, cause the data processing system manager to perform operations for managing failures of data processing systems of the data processing systems, the operations comprising:

generating a structured knowledge labeled dataset using:

one or more structured knowledge attributes stored in a structured knowledge repository, the one or more structured knowledge attributes being extracted from an architecture of a trained machine learning model, the architecture controls how the trained machine learning model generates inferences, and one or more failure prediction prompts stored in a failure prediction prompt library;

fine-tuning an inference model using the structured knowledge labeled dataset to obtain a trained inference model;

using the trained inference model to generate a failure prediction response, the failure prediction response comprising a failure prediction and a portion of the one or more structured knowledge attributes that provide for interpretability of the failure prediction, the failure prediction being one of the inferences; and providing the failure prediction response to a user wherein prior to generating the structured knowledge labeled dataset, the operations further comprise:

extracting, using one or more techniques comprising explainable artificial intelligence (AI) techniques, the one or more structured knowledge attributes from the architecture of trained machine learning model; and storing the one or more structured knowledge attributes extracted from trained machine learning model into the structured knowledge repository.

18. The data processing system manager of claim 17, wherein prior to using the trained inference model to generate the failure prediction response, the operations further comprise:

obtaining a failure prediction response request from the user for data stored in the structured knowledge repository, the data comprising the one or more structured knowledge attributes, and the data being usable to manage an indication of failure for a data processing system of the data processing systems.

19. The data processing system manager of claim 18, wherein the one or more failure prediction prompts include at least a short readout prompt, a long readout prompt, and a knowledge-base-article-based prompt.

20. The data processing system manager of claim 17, wherein the architecture of the trained machine learning model is hidden from a requestor of the failure prediction response, the requestor being the user, and the portion of the one or more structured knowledge attributes that provide for interpretability of the failure prediction further provides visibility for the user into understanding how and why the trained machine learning model generated the failure prediction of the failure prediction response, using the architecture, in a manner that the trained machine learning model generated the failure prediction while the architecture of the trained machine learning model remains hidden from the use.

\* \* \* \* \*